United States Patent
Matsunaga et al.

(10) Patent No.: US 6,993,909 B2
(45) Date of Patent: Feb. 7, 2006

(54) EGR-GAS TEMPERATURE ESTIMATION APPARATUS FOR INTERNAL COMBUSTION ENGINE

(75) Inventors: Akio Matsunaga, Susono (JP); Masato Katsuno, Anjo (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/695,873

(22) Filed: Oct. 30, 2003

(65) Prior Publication Data

US 2004/0084030 A1 May 6, 2004

(30) Foreign Application Priority Data

Nov. 1, 2002 (JP) .................................... 2002-320400

(51) Int. Cl.
  *F02B 33/44* (2006.01)
  *F02M 25/07* (2006.01)

(52) U.S. Cl. ................... 60/605.2; 123/568.12; 123/568.16; 73/118.1

(58) Field of Classification Search ........... 60/605.2; 123/568.12, 568.16; 73/118.1, 117.3
See application file for complete search history.

(56) References Cited

U.S. PATENT DOCUMENTS

| | | | | |
|---|---|---|---|---|
| 6,000,385 A | * | 12/1999 | Fukuma | .................. 123/568.16 |
| 6,085,732 A | * | 7/2000 | Wang et al. | ............ 123/568.16 |
| 6,116,083 A | * | 9/2000 | Cullen et al. | ............... 73/118.1 |
| 6,347,519 B1 | * | 2/2002 | Kreso | ......................... 60/605.2 |
| 6,434,476 B1 | * | 8/2002 | Zagone | .................. 123/568.16 |
| 6,622,548 B1 | * | 9/2003 | Hernandez | ................. 73/118.1 |
| 6,708,676 B2 | * | 3/2004 | Akao et al. | ............ 123/568.16 |
| 2003/0192516 A1 | * | 10/2003 | Brunemann et al. | ........ 60/605.2 |
| 2003/0226398 A1 | * | 12/2003 | Hernandez et al. | ........ 73/118.1 |

FOREIGN PATENT DOCUMENTS

| | | |
|---|---|---|
| JP | A 11-166452 | 6/1999 |
| JP | 2001-164999 | 6/2001 |
| JP | 2002129996 A * | 5/2002 |
| JP | 2002-180889 | 6/2002 |

\* cited by examiner

*Primary Examiner*—Thai-Ba Trieu
(74) *Attorney, Agent, or Firm*—Oliff & Berridge, PLC

(57) ABSTRACT

An EGR-gas temperature estimation apparatus for an internal combustion engine which has an exhaust circulation pipe and an EGR-gas cooling apparatus. The estimation apparatus obtains the cooling efficiency $\eta egr$ of the EGR-gas cooling apparatus from the temperature Tex of EGR gas at the inlet of the exhaust circulation pipe and the flow rate Gegr of the EGR gas, and obtains the temperature THW of engine cooling water, used as a coolant for the EGR-gas cooling apparatus. Subsequently, the estimation apparatus calculates the temperature Tegr of the EGR gas at the outlet of the exhaust circulation pipe by the expression Tegr=Tex−$\eta egr$·(Tex−THW). Since the cooling efficiency $\eta egr$ greatly changes depending on the EGR-gas flow rate Gegr and the EGR-gas temperature Tex, the estimation apparatus can accurately estimate the cooling efficiency $\eta egr$, and therefore can accurately estimate the EGR-gas temperature Tegr.

12 Claims, 12 Drawing Sheets

$Tex = fTex(XTex) = 545.9 XTex^{0.3489}$ $Pex = fPex(XPex) = -2 \cdot 10^{-8} \cdot XPex^2 + 0.0059 \cdot XPex + 100.59$

EGR-GAS TEMPERATURE ESTIMATION APPARATUS FOR INTERNAL COMBUSTION ENGINE

BACKGROUND OF THE INVENTION

1. Field of the Invention

The present invention relates to an EGR-gas temperature estimation apparatus, for an internal combustion engine, which estimates the temperature of EGR gas flowing through an exhaust circulation pipe of the internal combustion engine.

2. Description of the Related Art

Conventionally, there has been widely known an EGR apparatus which circulates a portion of exhaust gas of an internal combustion engine to an intake passage via an exhaust circulation pipe, in order to reduce the amount of nitrogen oxides ($NO_x$) discharged from the engine. Such an EGR apparatus is applied to both spark-ignition engines and diesel engines.

Meanwhile, in a diesel engine, combustion is effected at a super-lean air-fuel ratio. Specifically, since oxygen required for combustion is sufficiently present, the output of the diesel engine greatly depends on fuel quantity. Therefore, in a diesel engine, when the quantity of exhaust gas that is circulated so as to greatly reduce $NO_x$ emissions (i.e., the mass flow rate of EGR gas; hereinafter, simply referred to as "EGR gas flow rate") is increased, and a sufficient quantity of fuel is supplied to the engine so as to secure a required output of the engine, the increased EGR gas flow rate decreases the quantity of new air (quantity of oxygen) which the engine takes in, whereby the ratio of the new air quantity to the fuel quantity (i.e., air-fuel ratio) shifts to the rich side. As a result, emission of particulate matter (hereinafter referred to as "PM") increases.

In view of the forgoing drawback, there has been developed an EGR apparatus in which an EGR-gas cooling apparatus (EGR cooler) for cooling EGR gas is interposed in an exhaust circulation pipe in order to reduce the temperature of the EGR gas, to thereby increase the density of the EGR gas. The EGR apparatus can increase quantity of EGR gas, without reducing the quantity of new air, to thereby reduce emissions of $NO_x$ and PM simultaneously.

Meanwhile, for example, in the case where the above-described EGR gas flow rate is controlled on the basis of an EGR ratio, which is the ratio of the EGR gas flow rate to the flow rate of all gases taken in by an engine (hereinafter, also referred to as "intake air"), the EGR ratio must be accurately estimated, and in order to accurately estimate the EGR ratio, the quantity of intake air must be accurately estimated. Since the quantity of intake air changes depending on the temperature (intake-air temperature) as measured at a junction portion between an intake manifold and cylinders (at the outlet of the intake manifold), the intake-air temperature must be accurately estimated. Further, in order to accurately estimate the intake-air temperature, the temperature of new air and the temperature of the EGR gas immediately before being mixed with the new air (the latter temperature is substantially equal to the EGR-gas temperature as measured at the outlet of the EGR-gas cooling apparatus) must be accurately estimated. In other words, accurate determination or estimation of the temperature of the EGR gas after being cooled by the EGR-gas cooling apparatus is extremely important for appropriate control of the engine.

In view of the above, a conventional EGR apparatus equipped with the above-described EGR-gas cooling apparatus obtains a value k corresponding to the efficiency (cooling efficiency) of the EGR-gas cooling apparatus on the basis of engine speed and fuel injection quantity, and obtains its correction coefficient kh on the basis of EGR gas flow rate. Subsequently, the conventional apparatus estimates the EGR gas temperature Tegr at the outlet of the EGR-gas cooling apparatus by use of the above-described value k, the above-described correction coefficient kh, area A of a heat transfer surface of the EGR-gas cooling apparatus, flow rate G of EGR gas, specific heat Cp of EGR gas, temperature Twg of EGR gas cooling water, exhaust temperature Tex, and an expression $Tegr = Tex - Twg \cdot k \cdot A/(k \cdot kh \cdot A/2 - G \cdot Cp)$ (see, for example, Japanese Patent Application Laid-Open (kokai) No. 11-166452 (page 6, FIG. 11, and FIG. 14)).

However, even when the flow rate of EGR gas flowing into the EGR-gas cooling apparatus is constant, the cooling efficiency (heat conductivity, or heat transfer ratio) ηegr of the EGR-gas cooling apparatus changes greatly with the temperature of the EGR gas flowing into the EGR-gas cooling apparatus (this temperature is substantially equal to the EGR temperature as measured at an inlet of an exhaust circulation pipe where the exhaust circulation pipe is connected to the exhaust passage). Specifically, as shown in FIG. 17, even when the flow rate of EGR gas flowing into the EGR-gas cooling apparatus is constant, the cooling efficiency ηegr changes from the value at point A to the value at point B when the temperature of the EGR gas flowing into the EGR-gas cooling apparatus changes from a first temperature to a second temperature higher than the first temperature. Such a phenomenon occurs, because the greater the difference between the temperature of the EGR gas flowing into the EGR-gas cooling apparatus and the temperature of coolant of the EGR-gas cooling apparatus, the greater the quantity of heat that is taken from the EGR gas by the EGR-gas cooling apparatus.

Accordingly, the above-described conventional technique that estimates the cooling efficiency of the EGR-gas cooling apparatus without consideration of the temperature of the EGR gas flowing into the EGR-gas cooling apparatus has a problem in that the temperature of the EGR gas at the outlet of the EGR-gas cooling apparatus cannot be accurately estimated.

SUMMARY OF THE INVENTION

In view of the foregoing, an object of the present invention is to provide an EGR-gas temperature estimation apparatus for an internal combustion engine, which apparatus can accurately estimate an EGR-gas temperature on the outlet side of an EGR-gas cooling apparatus, by determining the cooling efficiency of the EGR-gas cooling apparatus on the basis of an EGR-gas temperature on the inlet side of the EGR-gas cooling apparatus.

Another object of the present invention is to provide an EGR-gas temperature estimation apparatus for an internal combustion engine, which apparatus can accurately estimate EGR-gas temperature at an EGR-gas outlet, which is a connection portion between an exhaust circulation pipe and an intake passage, by determining the cooling efficiency of an EGR-gas cooling apparatus on the basis of EGR-gas temperature at the inlet of the exhaust circulation pipe.

The present invention provides an EGR-gas temperature estimation apparatus for an internal combustion engine which has an exhaust circulation pipe connected between an exhaust passage and an intake passage, an EGR control valve interposed in the exhaust circulation pipe and adapted to control flow rate of EGR gas flowing through the exhaust circulation pipe, and an EGR-gas cooling apparatus interposed in the exhaust circulation pipe. The EGR-gas temperature estimation apparatus comprises means for obtaining a temperature of the EGR gas on an inlet side of the EGR-gas cooling apparatus; means for obtaining a corresponding value corresponding to the flow rate of the EGR gas flowing through the exhaust circulation pipe; cooling efficiency obtaining means for obtaining a cooling efficiency of the EGR-gas cooling apparatus on the basis of the EGR-gas temperature on the inlet side of the EGR-gas cooling apparatus and the obtained corresponding value; and outlet EGR-gas temperature estimating means for estimating a temperature of the EGR gas on an outlet side of the EGR-gas cooling apparatus on the basis of the EGR-gas temperature on the inlet side of the EGR-gas cooling apparatus and the obtained cooling efficiency.

As described above, in the present apparatus, since the cooling efficiency of the EGR-gas cooling apparatus is determined on the basis of the EGR-gas temperature on the inlet side of the EGR-gas cooling apparatus as well, the determined cooling efficiency is close to the actual value. Therefore, the present apparatus can accurately estimate the temperature of the EGR gas on the outlet side of the EGR-gas cooling apparatus.

The present invention also provides an EGR-gas temperature estimation apparatus for an internal combustion engine which has an exhaust circulation pipe connected between an exhaust passage and an intake passage, an EGR control valve interposed in the exhaust circulation pipe and adapted to control flow rate of EGR gas flowing through the exhaust circulation pipe, and an EGR-gas cooling apparatus interposed in the exhaust circulation pipe to be located between the EGR control valve and a connection portion of the exhaust circulation pipe through which the exhaust circulation pipe is connected to the exhaust passage. The EGR-gas temperature estimation apparatus comprises inlet EGR-gas temperature obtaining means for obtaining, as an exhaust-circulation-pipe-inlet EGR-gas temperature, a temperature of the EGR gas at an EGR gas inlet, which is the connection portion of the exhaust circulation pipe through which the exhaust circulation pipe is connected to the exhaust passage; EGR-gas-flow-rate corresponding value obtaining means for obtaining an EGR-gas-flow-rate corresponding value corresponding to the flow rate of the EGR gas flowing through the exhaust circulation pipe; cooling efficiency obtaining means for obtaining a cooling efficiency of the EGR-gas cooling apparatus on the basis of the obtained exhaust-circulation-pipe-inlet EGR-gas temperature and the obtained EGR-gas-flow-rate corresponding value; and outlet EGR-gas temperature estimating means for estimating, as an exhaust-circulation-pipe-outlet EGR-gas temperature, a temperature of the EGR gas at an EGR gas outlet, which is a connection portion of the exhaust circulation pipe through which the exhaust circulation pipe is connected to the intake passage, on the basis of the obtained exhaust-circulation-pipe-inlet EGR-gas temperature and the obtained cooling efficiency.

In the EGR-gas temperature estimation apparatus of the present invention, the temperature of the EGR gas at the EGR gas inlet, which is the connection portion of the exhaust circulation pipe through which the exhaust circulation pipe is connected to the exhaust passage, is obtained as an exhaust-circulation-pipe-inlet EGR-gas temperature by the inlet EGR-gas temperature obtaining means. The inlet EGR-gas temperature obtaining means may be means for obtaining the exhaust-circulation-pipe-inlet EGR-gas temperature, through calculation, from new-air flow rate, fuel quantity, intake pressure, exhaust pressure, etc., or means for obtaining the exhaust-circulation-pipe-inlet EGR-gas temperature on the basis of an output of a temperature sensor (exhaust temperature sensor) disposed in the exhaust passage in the vicinity of the connection portion between the exhaust passage and the exhaust circulation pipe.

Also, an EGR-gas-flow-rate corresponding value corresponding to the flow rate of the EGR gas flowing through the exhaust circulation pipe is obtained by the EGR-gas-flow-rate corresponding value obtaining means. The EGR-gas-flow-rate corresponding value may be the flow rate of the EGR gas flowing through the exhaust circulation pipe itself, or a value equivalent to the EGR-gas flow rate; e.g., flow velocity of the EGR gas flowing through the exhaust circulation pipe. Since the shape of the exhaust circulation pipe is known, through detection of the flow velocity of the EGR gas by use of, for example, a flow velocity sensor provided within the exhaust circulation pipe, the EGR-gas flow rate can be obtained on the basis of the detection value output from the sensor.

Moreover, the cooling efficiency of the EGR-gas cooling apparatus is obtained by the cooling efficiency obtaining means on the basis of the obtained exhaust-circulation-pipe-inlet EGR-gas temperature and the obtained EGR-gas-flow-rate corresponding value. The outlet EGR-gas temperature estimating means estimates, as an exhaust-circulation-pipe-outlet EGR-gas temperature, the temperature of the EGR gas at the EGR gas outlet, which is a connection portion of the exhaust circulation pipe through which the exhaust circulation pipe is connected to the intake passage, on the basis of the obtained exhaust-circulation-pipe-inlet EGR-gas temperature and the obtained cooling efficiency.

As described above, in the present apparatus, since the cooling efficiency of the EGR-gas cooling apparatus is determined on the basis of the exhaust-circulation-pipe-inlet EGR-gas temperature as well, the determined cooling efficiency is close to the actual value. Therefore, the present apparatus can accurately estimate the exhaust-circulation-pipe-outlet EGR-gas temperature.

In this case, preferably, the EGR-gas temperature estimation apparatus further comprises coolant temperature obtaining means for obtaining a temperature of a coolant of the EGR-gas cooling apparatus; and the outlet EGR-gas temperature estimating means estimates the exhaust-circulation-pipe-outlet EGR-gas temperature on the basis of the obtained temperature of the coolant.

The temperature of the coolant of the EGR-gas cooling apparatus causes changes in the exhaust-circulation-pipe-outlet EGR-gas temperature. By means of the above-described configuration, the temperature of the coolant of the EGR-gas cooling apparatus is taken into consideration to estimate the exhaust-circulation-pipe-outlet EGR-gas temperature, the exhaust-circulation-pipe-outlet EGR-gas temperature can be estimated more accurately.

In this case, the outlet EGR-gas temperature estimating means may be configured to estimate an EGR-gas temperature change ($\Delta T = \eta egr \cdot (Tex - Treibai)$) by multiplying, by the cooling efficiency $\eta egr$, the difference between the obtained exhaust-circulation-pipe-inlet EGR-gas temperature Tex and the obtained coolant temperature Treibai, and to estimate the exhaust-circulation-pipe-outlet EGR-gas temperature Tegr by subtracting the estimated EGR-gas temperature change $\Delta T$ from the exhaust-circulation-pipe-inlet EGR-gas temperature Tex (i.e., Tegr is estimated by use of the expression $Tegr = Tex - \eta egr \cdot (Tex - Treibai)$).

This configuration enables the phenomenon such that "the temperature of EGR-gas decreases greatly as the difference (ΔT=Tex−Treibai) between the exhaust-circulation-pipe-inlet EGR-gas temperature Tex and the obtained coolant temperature Treibai increases" is properly reflected in estimation of the exhaust-circulation-pipe-outlet EGR-gas temperature Tegr. Therefore, the exhaust-circulation-pipe-outlet EGR-gas temperature can be estimated more accurately.

Furthermore, the cooling efficiency obtaining means is preferably configured to obtain the cooling efficiency ηegr on the basis of a value (=Gegr/Tex) obtained by dividing the obtained EGR-gas-flow-rate corresponding value (e.g., EGR-gas flow rate Gegr) by the obtained exhaust-circulation-pipe-inlet EGR-gas temperature Tex.

An experiment revealed that the cooling efficiency ηegr of the EGR-gas cooling apparatus is generally in inverse proportion to the exhaust-circulation-pipe-inlet EGR-gas temperature Tex. Accordingly, the present apparatus can be configured as follows. The relation between the cooling efficiency ηegr and the value (=Gegr/Tex) obtained, for example, by dividing the EGR-gas flow rate Gegr by the exhaust-circulation-pipe-inlet EGR-gas temperature Tex, is obtained experimentally; and a function that represents the obtained relation is stored in a storage apparatus, or data representing the obtained relation are stored as table values in the storage apparatus. An actual cooling efficiency ηegr is obtained on the basis of an actual value of Gegr/Tex and the stored function or table values. Therefore, the cooling efficiency ηegr can be accurately obtained by use of a simpler configuration and a smaller storage capacity, as compared with the case in which the cooling efficiency ηegr is experimentally obtained for each of combinations (Gegr, Tex) of the EGR-gas flow rate Gegr and the exhaust-circulation-pipe-inlet EGR-gas temperature Tex, a function for obtaining ηegr is stored in a storage apparatus for each Tex, and a function corresponding to an actual EGR-gas temperature Tex is selected and used, or as compared with the case in which a huge amount of data consisting of sets of these data (Gegr, Tex, ηegr) are stored as table values in a storage apparatus, and a value of the cooling efficiency ηegr is obtained with reference to the table values.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

An embodiment of an control apparatus of an internal combustion engine (diesel engine) which incorporates an EGR-gas temperature estimation apparatus according to the present invention, as well as an EGR control apparatus, will now be described with reference to the drawings.

Figure 1:
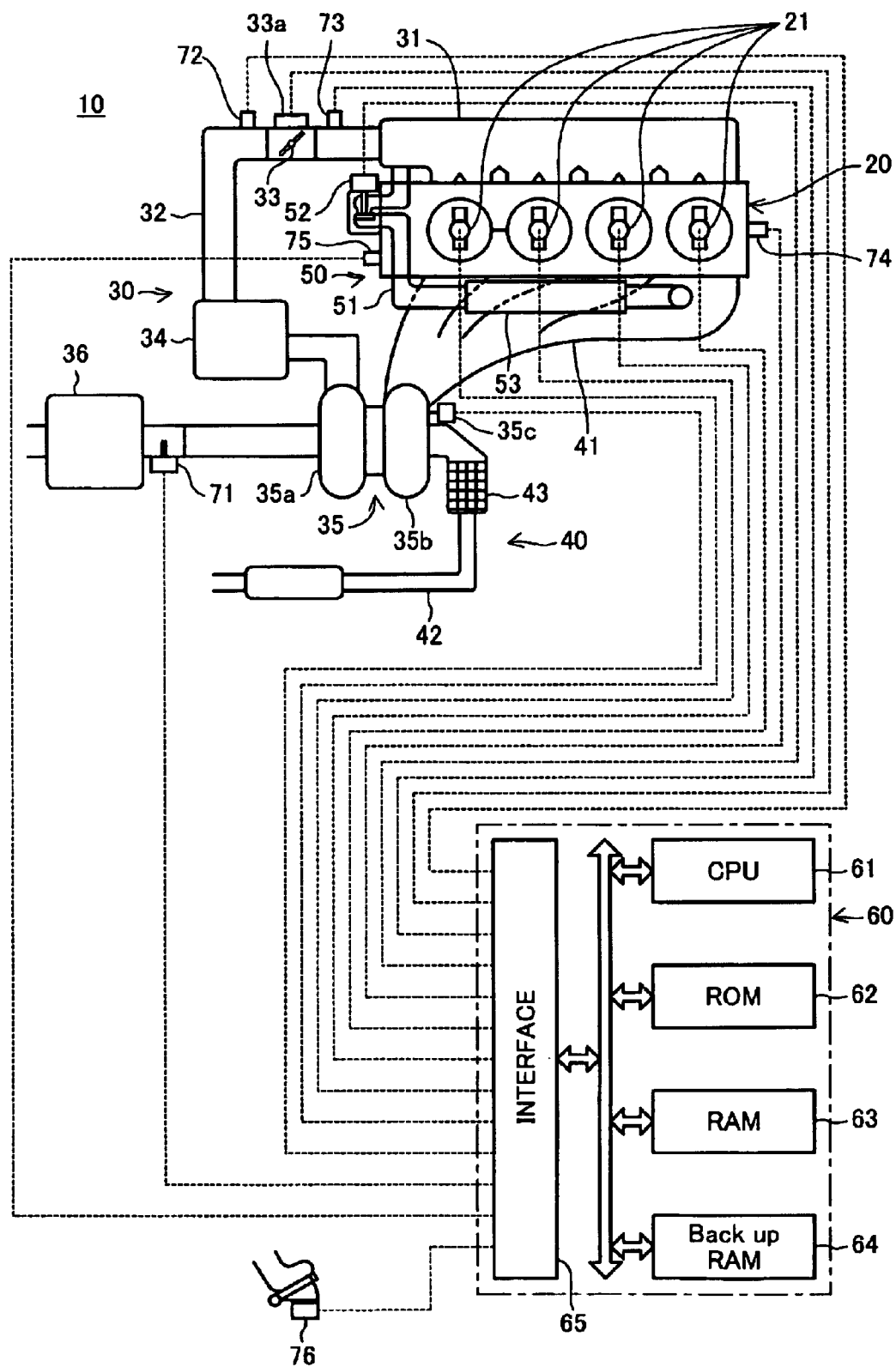
FIG. 1 a schematic diagram showing the entire configuration of a system in which an engine control apparatus according to a first embodiment of the present invention is applied to a four-cylinder internal combustion engine (diesel engine)

FIG. 1 schematically shows the entire configuration of a system in which the engine control apparatus according to the present invention is applied to a four-cylinder internal combustion engine (diesel engine) 10. This system comprises an engine main body 20 including a fuel supply system; an intake system 30 for introducing gas to combustion chambers of individual cylinders of the engine main body 20; an exhaust system 40 for discharging exhaust gas from the engine main body 20; an EGR apparatus 50 for performing exhaust circulation; and an electric control apparatus 60.

Fuel injection valves 21 are disposed above the individual cylinders of the engine main body 20. The fuel injection valves 21 are electrically connected to the electric control apparatus 60. In response to a drive signal (an instruction signal corresponding to an instruction fuel injection quantity qfin) from the electric control apparatus 60, each of the fuel injection valves 21 opens for a predetermined period of time, to thereby inject high-pressure fuel, which is supplied from an unillustrated fuel injection pump connected to a fuel tank.

The intake system 30 includes an intake manifold 31, which is connected to the respective combustion chambers of the individual cylinders of the engine main body 20; an intake pipe 32, which is connected to an upstream-side branching portion of the intake manifold 31 and constitutes an intake passage in cooperation with the intake manifold 31 (the intake manifold 31 and the intake pipe 32 may be collectively referred to as an "intake pipe"); a throttle valve 33, which is rotatably held within the intake pipe 32, and rotated by a throttle valve actuator 33a; an inter cooler 34, which is interposed in the intake pipe 32 to be located on the upstream side of the throttle valve 33; a compressor 35a of a turbocharger 35, which is interposed in the intake pipe 32 to be located on the upstream side of the inter cooler 34; and an air cleaner 36, which is disposed at a distal end portion of the intake pipe 32.

The exhaust system 40 includes an exhaust manifold 41, which is connected to the individual cylinders of the engine main body 20; an exhaust pipe 42, which is connected to a downstream-side merging portion of the exhaust manifold 41; a turbine 35b of the turbocharger 35 and a turbocharger throttle valve 35c, which are interposed in the exhaust pipe 42; and a diesel particulate filter (hereinafter referred to as "DPNR") 43, which is interposed in the exhaust pipe 42. The exhaust manifold 41 and the exhaust pipe 42 constitute an exhaust passage.

The turbocharger throttle valve 35c is connected to the electric control apparatus 60. In response to a drive signal from the electric control apparatus 60, the turbocharger throttle valve 35c changes the cross-sectional area of an exhaust gas passage for exhaust gas flowing into the turbine 35b, to thereby change the effective capacity of the turbocharger 35. When the cross-sectional area of the exhaust gas passage is reduced through closure of the turbocharger throttle valve 35c, the boost pressure increases. In contrast, when the cross-sectional area of the exhaust gas passage is increased through opening of the turbocharger throttle valve 35c, the boost pressure decreases.

The DPNR 43 is a filter unit which accommodates a filter formed of a porous material such as cordierite and which collects, by means of a porous surface, the particulate matter contained in exhaust gas passing through the filter. In the DPNR 43, at least one metal element selected from alkaline metals such as potassium K, sodium Na, lithium Li, and cesium Cs; alkaline-earth metals such as barium Ba and calcium Ca; and rare earth metals such as lanthanum La and yttrium Y is carried, together with platinum, on alumina serving as a carrier. Thus, the DPNR 43 also serves as a storage-reduction-type $NO_x$ catalyst unit which, after absorption of $NO_x$, releases the absorbed $NO_x$ and reduces it.

The EGR apparatus 50 includes an exhaust circulation pipe 51, which forms a passage (EGR passage) for circulation of exhaust gas; an EGR control valve 52, which is interposed in the exhaust circulation pipe 51; and an EGR-gas cooling apparatus (EGR cooler) 53, which is interposed in the exhaust circulation pipe 51.

A portion of the exhaust circulation pipe 51 connected to an exhaust passage (the exhaust manifold 41) located on the upstream side of the turbine 35b serves as an inlet for EGR gas (exhaust gas). A portion of the exhaust circulation pipe 51 connected to an intake passage (the intake manifold 31) located on the downstream side of the throttle valve 33 serves as an outlet for EGR gas. The exhaust circulation pipe 51 establishes communication between the inlet (exhaust circulation pipe inlet) and the outlet (exhaust circulation pipe outlet) to thereby form a gas flow pipe through which EGR gas flows from the inlet to the outlet.

When the intake manifold 31 is considered to be a gas flow pipe, its inlet is a connection portion between the intake manifold 31 and the exhaust circulation pipe 51, whereas the outlet of the intake manifold 31 is an intake air inflow portion extending toward the combustion chambers (openings to be opened and closed by intake valves) at which the intake manifold 31 is connected to the combustion chambers (cylinders) of the internal combustion engine 10.

The EGR control valve 52 is connected to the electric control apparatus 60. In response to a drive signal (EGR-control-valve opening instruction value SEGR) from the electric control apparatus 60, the EGR control valve 52 changes the quantity of exhaust gas to be circulated (exhaust-gas circulation quantity, EGR-gas flow rate), to thereby control the EGR ratio as will be described later.

The EGR-gas cooling apparatus 53 has a passage formed therein for EGR gas which flows into the inlet of the apparatus and leaves from the outlet of the apparatus. Further, the EGR-gas cooling apparatus 53 has a cooling section exposed to the passage for EGR gas. Cooling water for the engine, which serves as a coolant, is caused to circulate through the cooling section.

The electric control apparatus 60 is a micro computer which includes a CPU 61, ROM 62, RAM 63, a backup RAM 64, an interface 65, etc., which are connected to one another by means of a bus. The ROM 62 stores a program to be executed by the CPU 61, tables (lookup tables, maps), constants, etc. The RAM 63 allows the CPU 61 to temporarily store data. The backup RAM 64 stores data in a state in which the power supply is on, and holds the stored data even after the power supply is shut off. The interface 65 contains AD converters.

The interface 65 is connected to a hot-wire-type air flow meter 71, disposed in the intake pipe 32; a new-air temperature sensor (intake temperature sensor) 72, provided in the intake passage between the inter cooler 34 and the throttle valve 33; an intake pressure sensor 73, disposed in the intake passage to be located downstream of the throttle valve 33 and upstream of a point where the exhaust circulation pipe 51 is connected to the intake passage; an engine speed sensor 74; a water temperature sensor 75; and an accelerator opening sensor 76. The interface 65 receives respective signals from these sensors, and supplies the received signals to the CPU 61. Further, the interface 65 is connected to the fuel injection valves 21, the throttle valve actuator 33a, the turbocharger throttle valve 35c, and the EGR control valve 52; and outputs corresponding drive signals to these components in accordance with instructions from the CPU 61.

The hot-wire-type air flow meter 71 measures the mass flow rate of air (i.e., new air) that is newly taken into the intake pipe 32 via the air cleaner 36 (intake air quantity per unit time, new air quantity per unit time), and generates a signal (new-air flow rate) Ga corresponding to the mass flow rate of new air. The new-air temperature sensor 72 measures the temperature of new air that is taken into the intake pipe 32 via the air cleaner 36 (i.e., new-air temperature), and generates a signal Ta representing the new-air temperature. The intake pressure sensor 73 generates a signal Pb representing the pressure (intake pressure, boost pressure) within the intake passage.

The engine speed sensor 74 detects the rotational speed of the engine 10, and generates a signal representing the engine speed NE. The engine speed sensor 74 also can detect the absolute crank angle of each cylinder. The water temperature sensor 75 detects the temperature of cooling water of the engine 10, and generates a signal THW representing the detected temperature. The accelerator opening sensor 76 detects the position of an accelerator pedal AP, and generates a signal Accp representing the accelerator opening (accelerator position).

Figure 2:
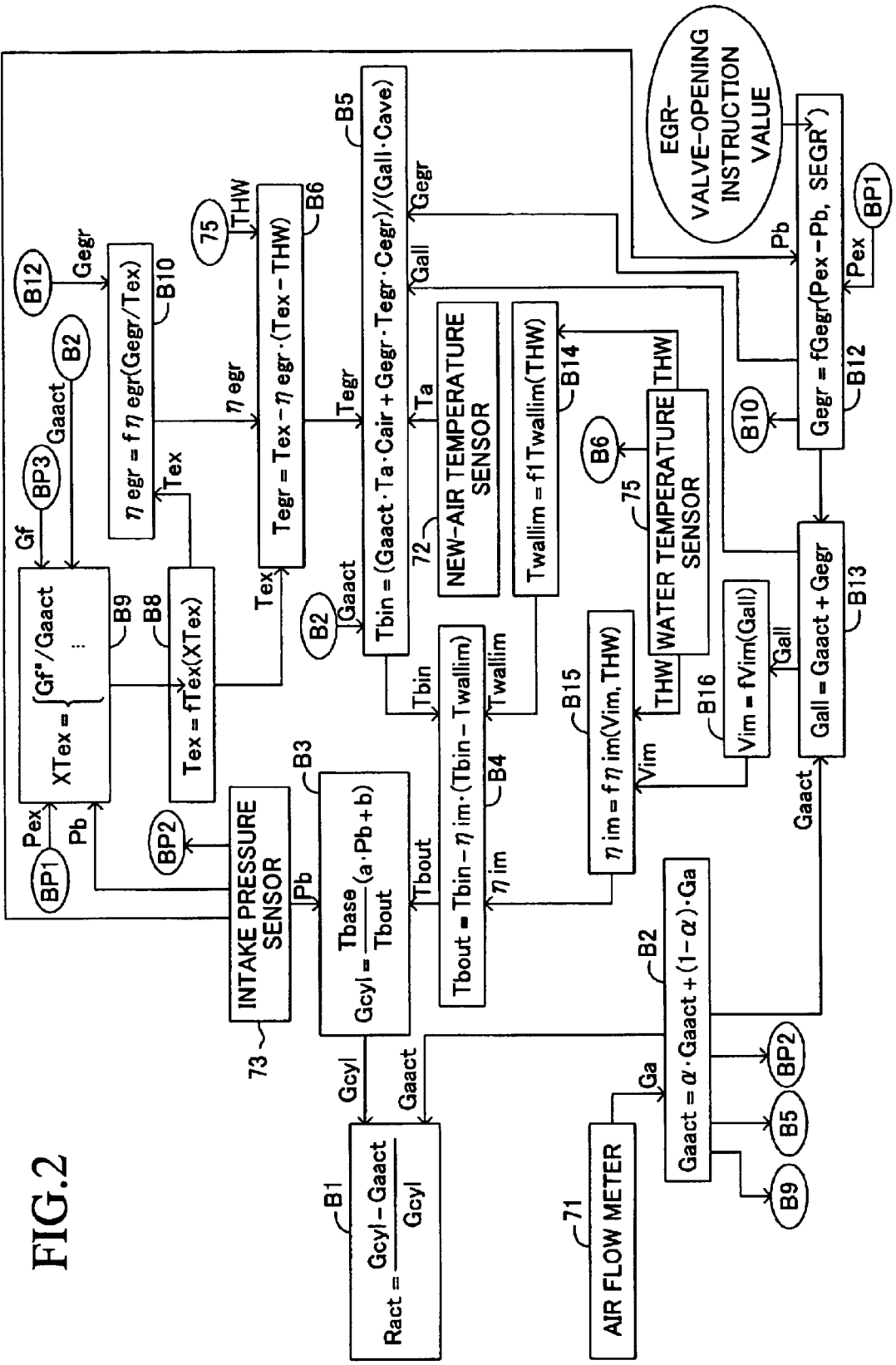
FIG. 2 is a functional block diagram showing the contents of a program that a CPU shown in FIG. 1 executes.
Figure 3:
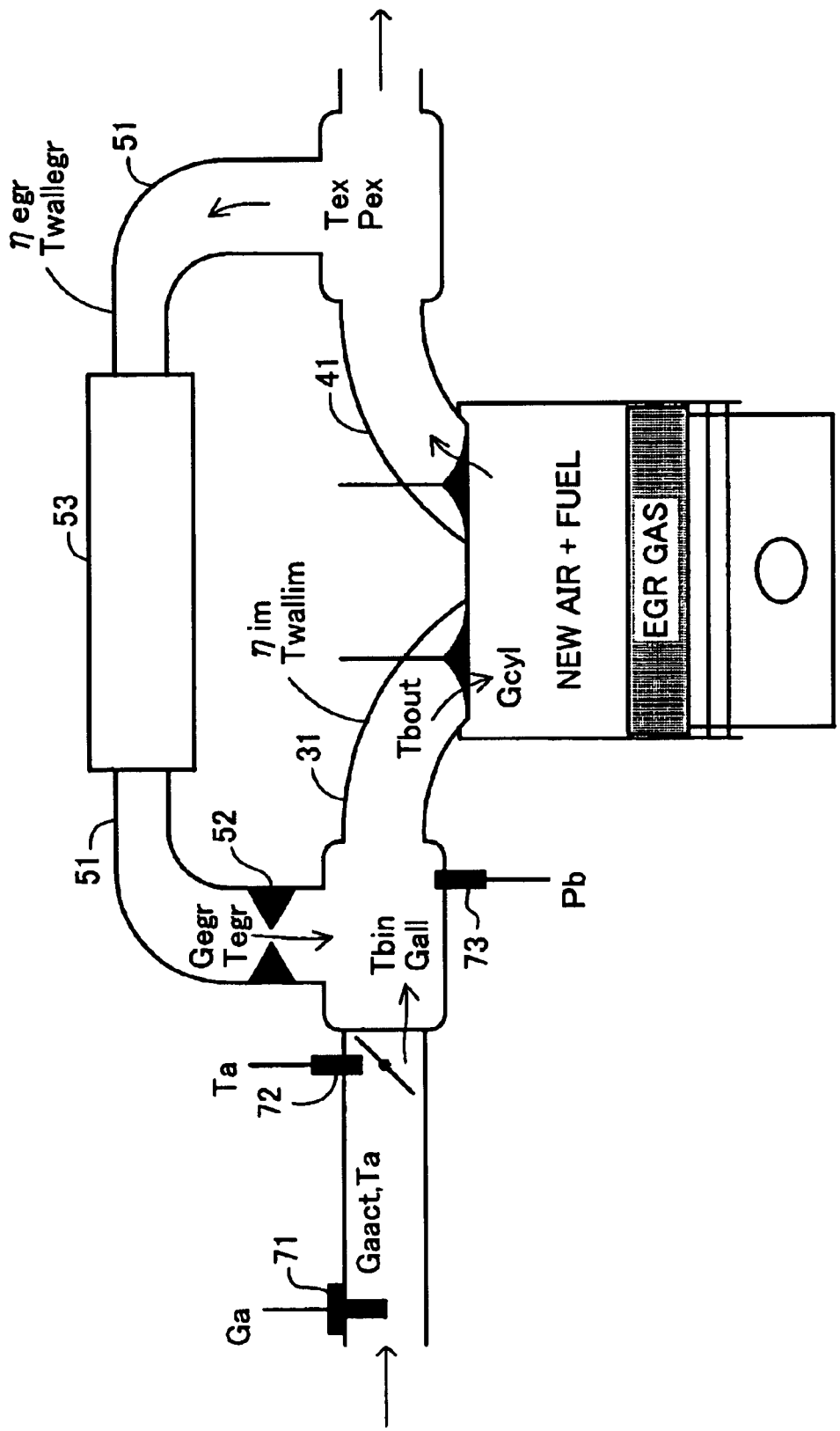
FIG. 3 is an explanatory diagram showing values that the CPU shown in FIG. 1 calculates.

Next, operation of the engine control apparatus having the above-described configuration will be described. The CPU 61 of the electric control apparatus 60 repeatedly executes, at predetermined intervals, a program for calculating various values, which program is shown in FIG. 2 in the form of a functional block diagram, to thereby calculate an actual EGR ratio Ract. Hereinafter, the program will be described on a block-by-block basis. Notably, some of values to be described below are shown in FIG. 3.

Obtainment of Actual EGR Ratio Ract

The actual EGR ratio Ract is a value (Ract=Gegr/Gcyl) obtained through division of an actual amount per unit time of EGR gas taken into a cylinder of the engine 10 (this is an actual EGR-gas mass flow rate, and is hereinafter referred to as "EGR-gas flow rate Gegr") by an actual amount per unit time of all gases taken into the cylinder (this is an actual all-gas mass flow rate, and is hereinafter referred to as "all-gas flow rate Gcyl"). The EGR-gas flow rate Gegr is equal to a value obtained by subtracting an amount per unit time of new air taken into the cylinder (this is an air mass flow rate, and hereinafter is referred to as "actual new-air flow rate Gaact") from the all-gas flow rate Gcyl. Accordingly, as shown in block B1, the CPU 61 calculates an actual EGR ratio Ract on the basis of the following Expression (1).

$$Ract = \frac{Gcyl - Gaact}{Gcyl} \quad (1)$$

Obtainment of Actual New-Air Flow Rate Gaact

The actual new-air flow rate Gaact used in Expression (1) changes with time delay with respect to a measured new-air flow rate Ga obtained through measurement by the air flow meter 71, and therefore is generally equal to a value obtained through performance of first-order lag processing for the measured new-air flow rate Ga. Accordingly, the CPU 61 calculates the actual new-air flow rate Gaact on the basis of the following Expression (2), which is shown in block B2 for performing the first-order lag processing for the measured new-air flow rate Ga. α is a constant which assumes a value of 0 to 1. Notably, Gaact(n) represents an actual new-air flow rate Gaact obtained by the present calculation; Gaact(n−1) represents an actual new-air flow rate Gaact obtained by the previous calculation, which is performed a predetermined time earlier than the present calculation; and Ga(n) represents a measured new-air flow rate Ga on the basis of the output of the air flow meter 71 at the present calculation timing.

$$Gaact(n) = \alpha \cdot Gaact(n-1) + (1-\alpha) \cdot Ga(n) \quad (2)$$

Obtainment of All-Gas Flow Rate Gcyl

As can be inferred from the state equation of gas, the all-gas flow rate Gcyl, which is further necessary for performing the calculation of Expression (1), assumes a value corresponding to the pressure (intake pressure) Pb within the intake pipe downstream of the throttle valve 33 and the temperature (intake-gas temperature) Tbout of gas taken into the cylinder of the engine 10. Hereinafter, the temperature Tbout of gas taken into the cylinder of the engine 10 is referred to as "intake-manifold-outlet gas temperature Tbout."

In actuality, the all-gas flow rate Gcyl receives the influence of the quantity of gas remaining in the cylinder of the engine 10. Accordingly, as shown in block B3, the CPU 61 calculates the all-gas flow rate Gcyl on the basis of an empirically derived formula expressed by the following Expression (3). In Expression (3), a and b are matching constants determined experimentally, and Tbase represents an intake-manifold-outlet gas temperature (reference temperature) when the constants a and b were determined. The intake pressure (boost pressure) Pb used in Expression (3) is obtained from the intake pressure sensor 73.

$$Gcyl = \frac{Tbase}{Tbout}(a \cdot Pb + b) \quad (3)$$

Obtainment of Actual Gas Temperature Tbout

In order to perform the calculation of Expression (3), the intake-manifold-outlet gas temperature Tbout must be obtained. As shown in block B4, the CPU 61 calculates the intake-manifold-outlet gas temperature Tbout in accordance with the following Expression (4).

$$Tbout = Tbin - \eta im \cdot (Tbin - Twallim) \quad (4)$$

In Expression (4),

Tbin represents the temperature of a mixture gas in a region within the intake manifold 31 on the outlet side of the EGR control valve 52; i.e., a region where EGR gas and new air are mixed (hereinafter, simply referred to as a "confluent portion" or an "intake-manifold inlet"), as shown in FIG. 3, and, hereinafter, the temperature of the mixture gas at the intake-manifold inlet is referred to as "intake-manifold-inlet gas temperature Tbin";

Twallim represents the wall temperature of the intake manifold 31 extending from the intake-manifold inlet to a corresponding intake valve, and, hereinafter, the wall temperature is referred to as "intake-manifold wall temperature Twallim"; and ηim represents the heat conductivity (cooling efficiency) of the intake manifold 31 in a region extending between the intake-manifold inlet and the intake-manifold outlet (a portion to be opened and closed by the intake valve), and, hereinafter, the heat conductivity is referred to as "intake-manifold heat conductivity ηim."

The above-described Expression (4) takes into consideration exchange of heat between the wall surface of the intake manifold 31 and gas taken into the cylinder, and exchange of heat between the wall surface of the intake manifold 31 and the outside air (air outside the intake manifold 31). These heat exchanges are represented by the second term (ηim (Tbin−Twallim)) on the right side. This value (ηim (Tbin−Twallim)) is a temperature change corresponding value which represents a change in temperature of intake air (new air+EGR gas) when the intake air passes through the intake manifold 31.

The heat exchange between the gas (intake air) and the gas flow pipe (intake manifold 31) has a strong correlation (for example, a proportional relation) with the difference between the temperature of the gas at the inlet and the wall temperature of the gas flow pipe. Further, the heat conductivity can properly express the exchange of heat between the gas and the wall of the gas flow pipe and the exchange of heat between the wall of the gas flow pipe and the outside. Therefore, the above-described configuration enables simple and accurate estimation of the heat exchange, to thereby enable accurate estimation of the temperature change corresponding value.

Meanwhile, in order to obtain the intake-manifold-outlet gas temperature Tbout by use of Expression (4), the respective values (Tbin, Twallim, ηim) on the right side of Expression (4) must be obtained. Procedures for obtaining these values will be described on an individual basis.

Obtainment of Intake-Manifold-Inlet Gas Temperature Tbin

As shown in block B5, the CPU 61 calculates the intake-manifold-inlet gas temperature Tbin in accordance with the following Expression (5), which is based on the law of energy conservation.

$$Tbin=(Gaact\cdot Ta\cdot Cair+Gegr\cdot Tegr\cdot Cegr)/(Gall\cdot Cave) \quad (5)$$

Respective values on the right side of Expression (5) will be described with reference to FIG. 3.

Gaact represents the previously-described actual new-air flow rate, which is obtained by the above-described block B2 in accordance with Expression (2).

Ta represents the previously-described new-air temperature, which is detected by the new-air temperature sensor 72.

Cair represents the specific heat of new air (new-air specific heat), which is a constant that is previously given.

Gegr represents the previously-described EGR-gas flow rate, which is obtained by a method described below.

Tegr represents the EGR-gas temperature immediately before EGR gas and new air are mixed at the confluent portion. Specifically, the temperature Tegr is the temperature of EGR gas at an EGR gas outlet, which is a connection portion of the exhaust circulation pipe 51 through which the exhaust circulation pipe is connected to the intake passage, and is hereinafter referred to as "exhaust-circulation-pipe-outlet EGR-gas temperature (EGR-passage-outlet EGR-gas temperature) Tegr." The exhaust-circulation-pipe-outlet EGR-gas temperature Tegr is obtained by a method described below.

Cegr represents the specific heat of EGR gas (EGR-gas specific heat), which is a constant that is previously given.

Gall represents the total quantity of the mixture of EGR gas and new air; i.e., the sum of the actual new-air flow rate Gaact and the EGR-gas flow rate Gegr, and is hereinafter referred to as "intake-manifold-inlet gas flow rate Gall."

Cave represents the specific heat (mixture gas specific heat) of the mixture of EGR gas and new air, which is a constant that is previously given.

In order to obtain the intake-manifold-inlet gas temperature Tbin by use of Expression (5), the exhaust-circulation-pipe-outlet EGR-gas temperature Tegr, the EGR-gas flow rate Gegr, and the intake-manifold-inlet gas flow rate Gall must be obtained. Procedures for obtaining these values will be described on an individual basis.

Obtainment of Exhaust-Circulation-Pipe-Outlet EGR-Gas Temperature Tegr

As shown in block B6, the CPU 61 calculates the exhaust-circulation-pipe-outlet EGR-gas temperature Tegr in accordance with the following Expression (6). Block B6 serves as an outlet EGR-gas temperature estimating means.

$$Tegr=Tex-\eta egr(Tex-THW) \quad (6)$$

In Expression (6),

Tex represents the EGR-gas temperature at the inlet of the exhaust circulation pipe 51 in the vicinity of the connection portion between the exhaust circulation pipe 51 and the exhaust manifold 41 (i.e., exhaust gas temperature in the vicinity of the connection portion between the exhaust manifold 41 and the exhaust circulation pipe 51), and is hereinafter referred to as "exhaust-circulation-pipe-inlet EGR-gas temperature (EGR-passage-inlet EGR-gas temperature) Tex";

$\eta egr$ represents the cooling efficiency (heat conductivity) of the EGR-gas cooling apparatus 53; and THW represents the temperature of cooling water of the engine 10, which is equal to the temperature Treibai of coolant, because the coolant of the EGR-gas cooling apparatus 53 is the cooling water of the engine.

The above-described Expression (6) takes into consideration exchange of heat between the EGR-gas cooling apparatus 53 (the cooling section thereof) and EGR gas flowing through the EGR-gas cooling apparatus 53. That is, the second term ($\eta egr$ (Tex−THW)) on the right side of Expression (6) is a temperature change corresponding value which represents a change in temperature of EGR gas when the EGR gas flows through the EGR-gas cooling apparatus 53.

In actuality, exchange of heat occurs between every portion of EGR gas and the wall surface of the exhaust circulation pipe 51 during a period between a point in time when that portion of the EGR gas flows into the inlet of the exhaust circulation pipe 51 and a point in time when that portion of the EGR gas reaches the outlet of the exhaust circulation pipe 51. However, the quantity of heat exchanged between the EGR gas and the wall surface of the exhaust circulation pipe 51 is considerably small as compared with the quantity of heat exchanged between the EGR gas and the EGR-gas cooling apparatus 53. Accordingly, the second term ($\eta egr$ (Tex−THW)) on the right side of Expression (6) is substantially equal to a value that represents a change in temperature of EGR gas during a period between entrance to the inlet of the exhaust circulation pipe 51 and arrival at the outlet of the exhaust circulation pipe 51.

Meanwhile, in order to obtain the exhaust-circulation-pipe-outlet EGR-gas temperature Tegr by use of Expression (6), the above-described exhaust-circulation-pipe-inlet EGR-gas temperature Tex and the above-described cooling efficiency $\eta egr$ of the EGR-gas cooling apparatus must be obtained. Procedures for obtaining these values will be described on an individual basis.

Obtainment of Exhaust-Circulation-Pipe-Inlet EGR-Gas Temperature Tex

As shown in blocks B8 and B9, the CPU 61 calculates the exhaust-circulation-pipe-inlet EGR-gas temperature Tex (exhaust gas temperature Tex) in accordance with the following Expression (7). Blocks B8 and B9 serve as an EGR-gas temperature obtaining means.

$$Tex=fTex(XTex) \quad (7)$$

$$XTex=Gf^a/Gaact \text{ or}$$

$$XTex=(Gf^a/Gaact)(Pb/Pex) \text{ or}$$

$$XTex=Gf\,\Phi \text{ or}$$

$$XTex=Gf\,\Phi(Pb/Pex)$$

$$\Phi=Gf/Ga$$

where

Gf: fuel injection quantity per unit time (g/s)

Gaact: actual new-air flow rate (g/s)

Pb: boost pressure

Pex: exhaust manifold gas pressure

Φ: flow-rate ratio (equivalent ratio)

a: constant

Figure 4:
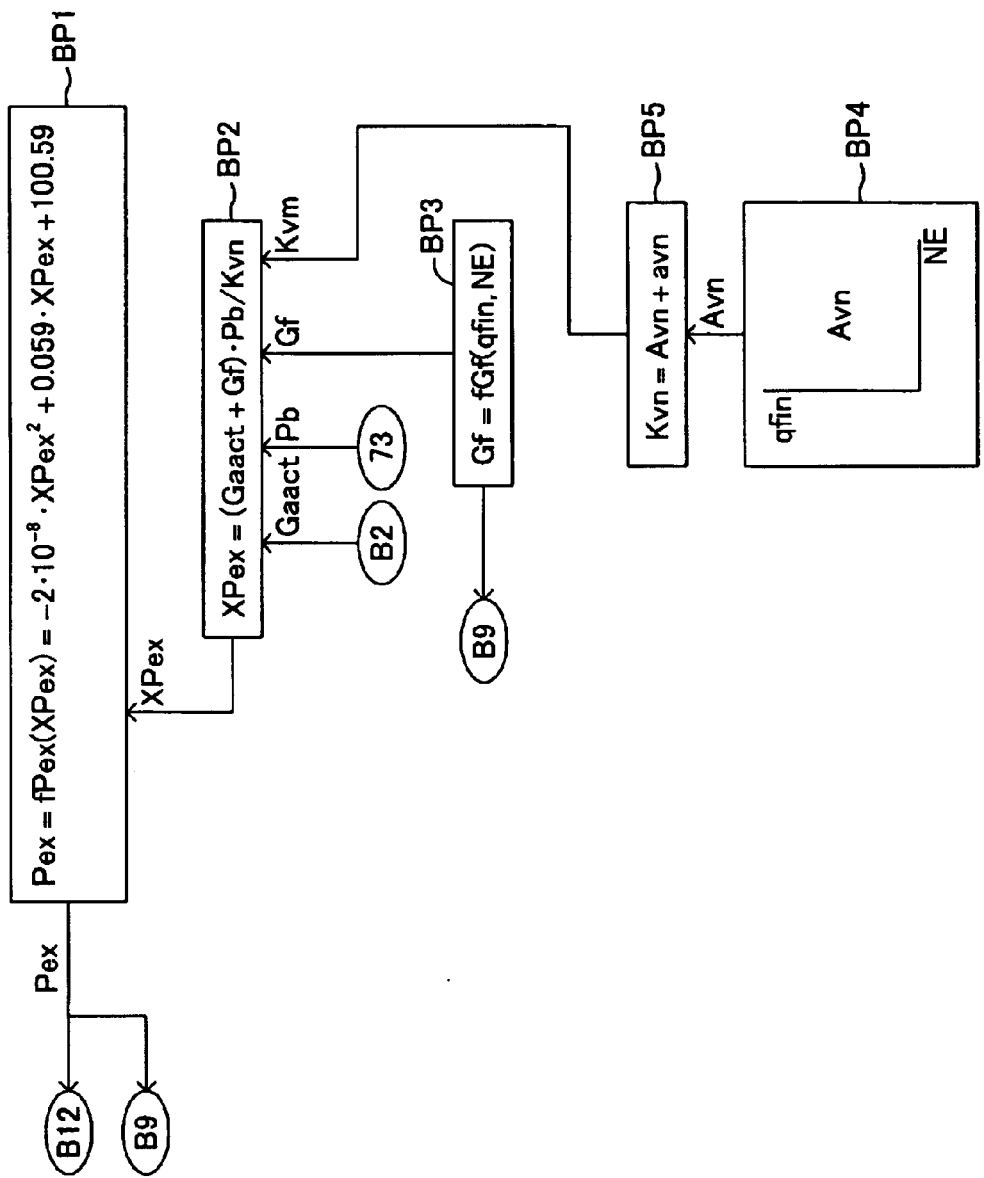
FIG. 4 is a functional block diagram showing the contents of a program that the CPU shown in FIG. 1 executes.

In Expression (7), the fuel injection quantity per unit time Gf can be obtained on the basis of instruction fuel injection quantity qfin and engine speed NE, as shown in block BP3 of FIG. 4 (e.g., Gf=kGf·qfin·NE (kGf: constant));

the actual new-air flow rate Gaact is obtained by the above-described block B2 on the basis of Expression (2);

the boost pressure Pb is the intake pressure Pb, and is obtained from the intake pressure sensor 73; and the exhaust manifold gas pressure Pex is obtained by a method described below.

The above-described Expression (7) is based on the finding that "the exhaust-circulation-pipe-inlet EGR-gas temperature Tex greatly depends on energy supplied to a cylinder (heat generation amount), and transfer to the gas of heat generated within the cylinder." The energy supplied to the cylinder has a strong correlation with the fuel injection quantity Gf. Further, the transfer of heat generated within the cylinder to the gas has a strong correlation with the actual new-air flow rate Gaact (the actual new-air flow rate Gaact does not contribute to heat generation, but functions to decrease the exhaust gas temperature), or the flow-rate ratio Φ, which is a value relating to the gas specific heat. Therefore, in Expression (7), the above-described values are selectively used for the variable XTex.

Notably, the value (boost pressure Pb/exhaust manifold gas pressure Pex), which is one value used for the variable XTex, represents the easiness of passage of exhaust gas through the exhaust manifold 41 (the easiness of remaining within the exhaust manifold 41). The longer the time during which the exhaust gas remains within the exhaust manifold 41, the greater the quantify of heat transferred between the exhaust gas and the outside of the exhaust manifold 41. Accordingly, through introduction of (boost pressure Pb/exhaust manifold gas pressure Pex) as a parameter, estimation accuracy of the exhaust-circulation-pipe-inlet EGR-gas temperature Tex is improved. Further, the boost pressure Pb has a correlation with the EGR gas quantity, and when the EGR gas quantity increases, the temperature at the time of start of combustion increases, and the exhaust gas temperature Tex (exhaust-circulation-pipe-inlet EGR-gas temperature Tex) increases accordingly. From this point of view, employment of the boost pressure Pb as a parameter contributes to improving the estimation accuracy of the exhaust gas temperature Tex.

The function fTex and the constant a in Expression (7) are determined for each engine model. The following is an example procedure of determining the function fTex and the constant a.

(Step 1) Operation conditions of an engine, for which the function fTex and the constant a are to be determined, are changed; and necessary engine state quantities (Gf, Gaact, Pb, Pex, Tex) are measured.

(Step 2) On the basis of measurement results, the constant a is determined in such a manner that the variable XTex and an actually measured value of the EGR-gas temperature Tex exhibit close correlation. Notably, when a value containing the flow rate ratio Φ is employed as the variable XTex, the adjustment (determination) of the value of the constant a is omitted.

(Step 3) The function fTex is determined on the basis of the variable XTex determined in accordance with the determined constant a, as well as the actually measured value of the EGR-gas temperature Tex.

Figure 5:
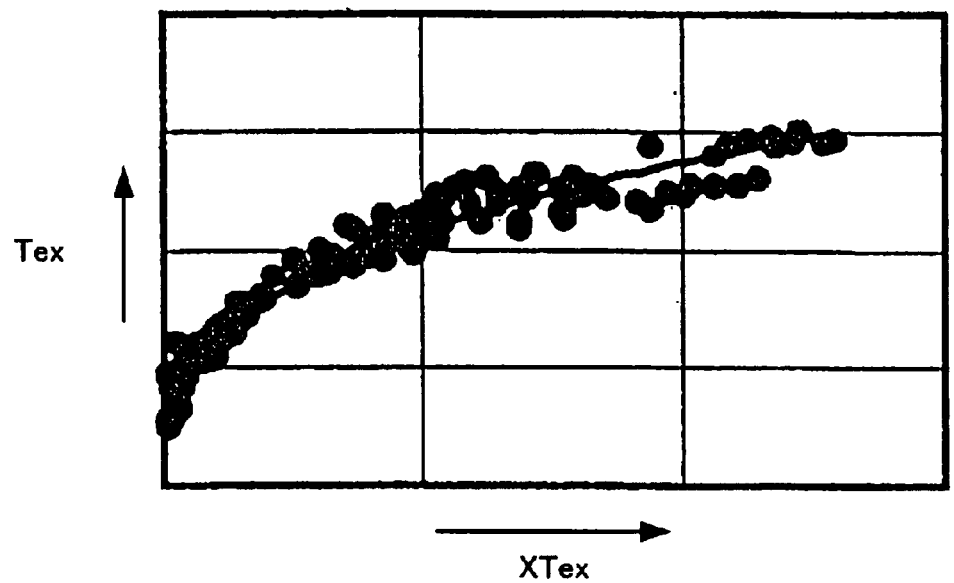
FIG. 5 is a graph showing actually measured values that were used to determine a function fTex which is a function for obtaining exhaust-circulation-pipe-inlet EGR-gas temperature Tex.

FIG. 5 shows an example of the relation between the variable XTex and the actually measured exhaust-circulation-pipe-inlet EGR-gas temperature Tex for the case where Gf·Φ (Pb/Pex) is selected as the variable XTex. In this case, the function fTex was determined as follows.

$$\text{Tex}=f\text{Tex}(X\text{Tex})=545.9\ X\text{Tex}^{0.3489}$$

Obtainment of Exhaust Manifold Gas Pressure Pex

In the case where a variable containing the exhaust manifold gas pressure Pex is used as the variable XTex of the above-described Expression (7), the exhaust manifold gas pressure Pex must be obtained. As shown in FIG. 4, which is a functional block diagram, the CPU 61 calculates the exhaust manifold gas pressure Pex in accordance with the following Expression (8).

$$\left.\begin{array}{l} Pex = fPex(XPex) \\ XPex = (Gf + Gaact) \cdot Pb/Kvn \\ Kvn = Avn + avn \end{array}\right\} \quad (8)$$

where

Gf: fuel injection quantity per unit time (g/s)

Gaact: actual new-air flow rate (g/s)

Pb: boost pressure

Kvn: throttle coefficient of the variable capacity turbocharger

Avn: opening of the variable capacity turbocharger (0–100%)

avn: positive constant

In Expression (8), the fuel injection quantity Gf is obtained on the basis of instruction fuel injection quantity qfin and engine speed NE, as shown in block BP3 of FIG. 4;

the actual new-air flow rate Gaact is obtained by the above-described block B2 on the basis of Expression (2);

the boost pressure Pb is the intake pressure Pb, and is obtained from the intake pressure sensor 73; and the opening Avn of the variable capacity turbocharger is a value determined with reference to a table, as shown in block BP4 of FIG. 4, where the instruction fuel injection quantity qfin and the engine speed NE are used as arguments.

The CPU 61 supplies a drive signal to the turbocharger throttle value 35c in such a manner that the opening of the turbocharger throttle value 35c corresponds to the value Avn. Further, in block BP5, the constant avn is added to the opening Avn of the variable capacity turbocharger, whereby the opening Avn is converted to the variable-capacity-turbocharger throttle coefficient Kvn of Expression (8). Notably, as will be described later, a target boost pressure may be set, and the value Avn may be determined in such a manner that the actual boost pressure becomes equal to the target boost pressure.

The above-described Expression (8) is based on the finding that "the exhaust manifold gas pressure Pex has a strong correlation with the quantity of gas flowing into the cylinder (Gaact+Gf), the opening Avn of the turbocharger throttle value 35c, and the boost pressure, which represents the resistance of the turbine 35b of the turbocharger 35."

The function fPex and the constant avn in Expression (8) are determined for each engine model. The following is an example procedure for determining the function fPex and the constant avn.

(Step 1) Operation conditions of an engine, for which the function fPex and the constant avn are to be determined, are changed; and necessary engine state quantities (Gf, Gaact, Pb, Avn, Pex) are measured.

(Step 2) On the basis of measurement results, the constant avn is determined in such a manner that the variable XPex and the exhaust manifold gas pressure Pex exhibit close correlation.

(Step 3) The function fPex is determined on the basis of the variable XPex determined in accordance with the determined constant avn, as well as the actually measured value of the exhaust manifold gas pressure Pex.

Figure 6:
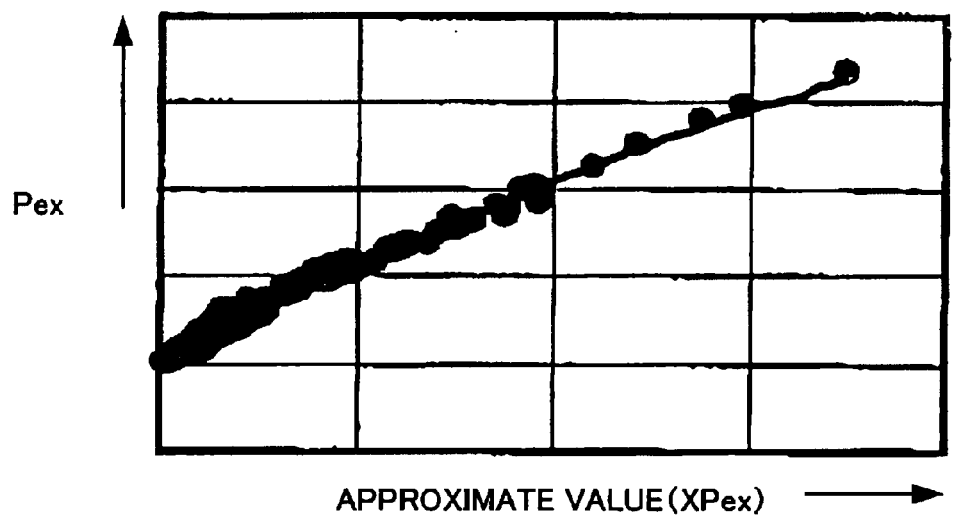
FIG. 6 is a graph showing actually measured values that were used to determine a function fPex which is a function for obtaining exhaust-manifold gas pressure Pex.

FIG. 6 shows measurement values which were used to determine the function fPex in the above-described manner. In this case, the function fPex was determined as represented by the following Expression (9). As described above, in the present embodiment, the exhaust pressure Pex can be obtained without use of an exhaust pressure sensor, whereby cost of the apparatus can be reduced.

$$Pex = fPex(XPex) = -2 \cdot 10^{-8} \cdot XPex^2 + 0.059 \cdot XPex + 100.59 \quad (9)$$

Through the above-described procedure, the various values (Gf, Gaact, Pb, Pex) necessary for obtaining the variable XTex of Expression (7) are obtained, and the variable XTex is determined. Accordingly, the CPU 61 obtains the exhaust-circulation-pipe-inlet EGR-gas temperature Tex (exhaust gas temperature Tex) by performing calculation in accordance with Expression (7). Meanwhile, in order to obtain the exhaust-circulation-pipe-outlet EGR-gas temperature Tegr by use of Expression (6), the cooling efficiency $\eta egr$ of the EGR-gas cooling apparatus must be further obtained.

Obtainment of Cooling Efficiency $\eta egr$ of EGR-Gas Cooling Apparatus

As shown in block B10 of FIG. 2, the CPU 61 calculates the cooling efficiency $\eta egr$ of the EGR-gas cooling apparatus in accordance with the following Expression (10). Block B10 serves as a cooling-apparatus cooling efficiency obtaining means (estimation means).

$$\eta egr = f\eta egr(Gegr/Tex) \quad (10)$$

As shown in Expression (10), in order to obtain the cooling efficiency $\eta egr$ of the EGR-gas cooling apparatus, the above-described exhaust-circulation-pipe-inlet EGR-gas temperature Tex and EGR-gas flow rate Gegr must be obtained. The exhaust-circulation-pipe-inlet EGR-gas temperature Tex is obtained by blocks B8 and B9 in accordance with the above-described Expression (7). The EGR-gas flow rate Gegr is obtained by block B12, which will be described later, in accordance with Expression (11) described below.

Notably, a value (EGR-gas flow rate corresponding value) corresponding to the EGR-gas flow rate Gegr may be used as the EGR-gas flow rate Gegr in Expression (10). For example, the EGR-gas flow rate Gegr may be replaced with EGR-gas flow velocity Vegr at a predetermined location of the exhaust circulation pipe 51. Since the shape of the EGR passage (the EGR passage formed by the exhaust circulation pipe 51 and the EGR-gas cooling apparatus 53) is known, the EGR-gas flow rate Gegr can be estimated on the basis of the EGR-gas flow velocity Vegr. This is the reason why the EGR-gas flow rate Gegr can be replaced with the EGR-gas flow velocity Vegr. The EGR-gas flow velocity Vegr may be obtained directly from a flow velocity sensor disposed within the exhaust circulation pipe 51.

The function $f\eta egr$ in Expression (10) is determined for each engine model. The following is an example procedure for determining the function $f\eta egr$.

(Step 1) Operation conditions of an engine, for which the function $f\eta egr$ is to be determined, are changed; and necessary engine state quantities (Gegr, Tex, $\eta egr$) are measured.

Figure 7:
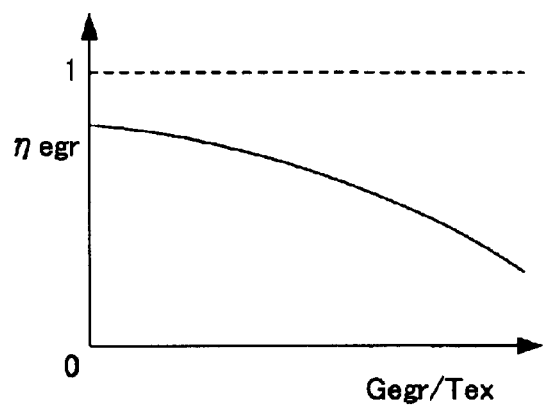
FIG. 7 is a graph showing the relation between cooling efficiency ηegr of an EGR-gas cooling apparatus and a value (Gegr/Tex) obtained by dividing EGR-gas flow rate Gegr by exhaust-circulation-pipe-inlet EGR-gas temperature Tex.

(Step 2) On the basis of measurement results, the relation between $\eta egr$ and Gegr/Tex is determined in the form of a graph, as shown in FIG. 7.

(Step 3) The function $f\eta egr$ is determined on the basis of the graph prepared in Step 2.

Figure 17:
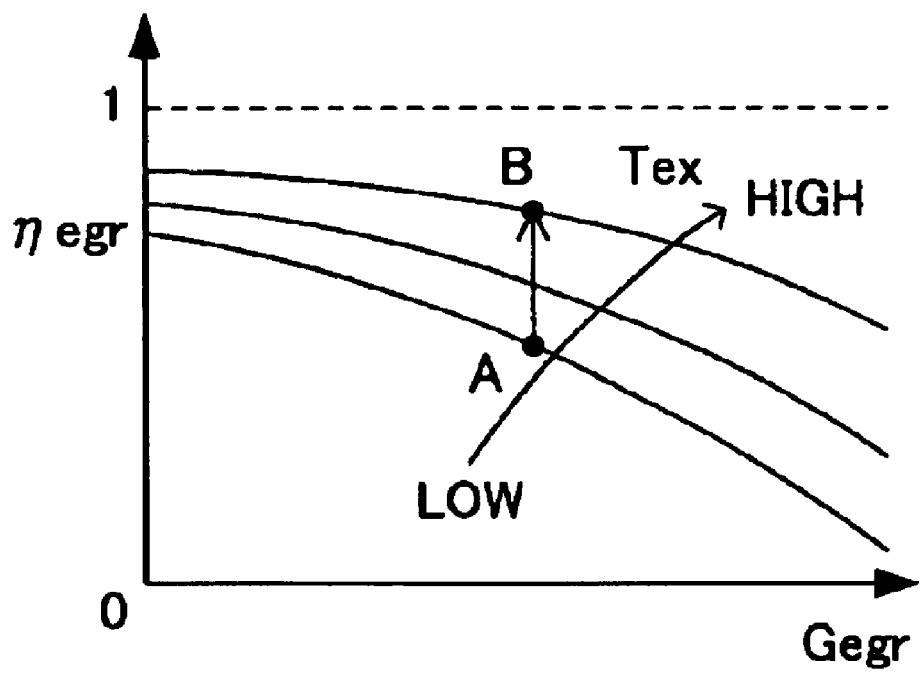
FIG. 17 is a graph showing the relation between cooling efficiency ηegr and EGR-gas flow rate Gegr, with exhaust-circulation-pipe-inlet EGR-gas temperature Tex used as a parameter.

As shown in FIG. 17, the relation between the cooling efficiency $\eta egr$ and the EGR-gas flow rate Gegr changes as the exhaust-circulation-pipe-inlet EGR-gas temperature Tex changes. In contrast, as shown in FIG. 7, the relation between the cooling efficiency $\eta egr$ and the value (=Gegr/Tex) obtained by dividing the EGR-gas flow rate Gegr by the exhaust-circulation-pipe-inlet EGR-gas temperature Tex is univocally determined, irrespective of the exhaust-circulation-pipe-inlet EGR-gas temperature Tex. In other words, since an experiment revealed that the cooling efficiency $\eta egr$ is generally in inverse proportion to the exhaust-circulation-pipe-inlet EGR-gas temperature Tex, the function $f\eta egr$ can be simply obtained by obtaining the cooling efficiency $\eta egr$ while using the value (Gegr/Tex) as a variable.

In the present apparatus, the above-described function $f\eta egr$ is stored in the ROM 62 in the form of a function, or data consisting of combinations of values of Gegr/Tex and $\eta egr$ are stored in the ROM 62 in the form of values of a table (single-dimensional map); and an actually-obtained cooling efficiency $\eta egr$ is obtained on the basis of an actual value of Gegr/Tex and the stored function or table. Notably, when the electric control apparatus 60 has surplus calculation capability and/or storage capacity, there may be employed a method such that values of Gegr, Tex, and $\eta egr$ are measured, while operating conditions of the engine are changed; the measured data are stored in the ROM 62 in the form of a table Map$\eta egr$ (two-dimensional map); and an actual cooling efficiency $\eta egr$ is obtained on the basis of an actual EGR-gas flow rate Gegr, an actual exhaust-circulation-pipe-inlet EGR-gas temperature Tex, and the stored table Map$\eta egr$. Alternatively, there may be employed a method such that a function gTex(Gegr) for determining the cooling efficiency $\eta egr$ from the EGR-gas flow rate Gegr is obtained and stored in the ROM for each exhaust-circulation-pipe-inlet EGR-gas temperature Tex; a proper function gTex is selected from the plurality of stored functions gTex on the basis of an actual exhaust-circulation-pipe-inlet EGR-gas temperature Tex; and an actual cooling efficiency $\eta egr$ is obtained from the selected function gTex and an actual EGR-gas flow rate Gegr.

Through the above-described procedure, the exhaust-circulation-pipe-inlet EGR-gas temperature Tex, the cooling efficiency $\eta egr$ of the EGR-gas cooling apparatus, and the cooling water temperature THW (coolant temperature Treibai), which are necessary for the calculation performed by block B6 in accordance with Expression (6), are obtained. Therefore, the CPU 61 can obtain the exhaust-circulation-pipe-outlet EGR-gas temperature Tegr by use of Expression (6). At this stage, the above-described EGR-gas flow rate Gegr and intake-manifold-inlet gas flow rate Gall, which are variables, are required for performing the calculation of Expression (5). These values are obtained as follows.

Obtainment of EGR-Gas Flow Rate Gegr

The EGR-gas flow rate Gegr can be obtained from the differential pressure (Pex–Pb) across the EGR control valve 52 and the EGR-control-valve opening instruction value SEGR, which represents the opening of the EGR control valve 52. That is, as shown in block B12, the CPU 61 calculates the EGR-gas flow rate Gegr in accordance with the following Expression (11). Block B12 serves as an EGR-gas-flow-rate corresponding value obtaining means. Notably, the function fGegr is experimentally obtained in advance, and stored in the ROM 62.

$$Gegr = fGegr(Pex-Pb, SEGR) \quad (11)$$

In Expression (11), the exhaust manifold gas pressure Pex is obtained by block BP1 of FIG. 4 in accordance with the above-described Expression (8). The boost pressure Pb is obtained from the intake pressure sensor 73. The EGR-control-valve opening instruction value SEGR is an instruction value supplied from the CPU 61 to the EGR control valve 52. In this case, instead of the EGR-control-valve opening instruction value SEGR, a signal from a sensor which detects the opening (lift amount) of the EGR control valve 52 may be used.

Obtainment of Intake-Manifold-Inlet Gas Flow Rate Gall

As described above, the intake-manifold-inlet gas flow rate Gall is the sum of the actual new-air flow rate Gaact and the EGR-gas flow rate Gegr. As shown in block B13, the CPU 61 calculates the intake-manifold-inlet gas flow rate Gall in accordance with the following Expression (12).

$$Gall = Gaact + Gegr \qquad (12)$$

The actual new-air flow rate Gaact in expression (12) is obtained by block B2 on the basis of the above-described Expression (2). The EGR-gas flow rate Gegr is obtained by block B12 on the basis of the above-described Expression (11).

Through the above-described procedure, the various values required for performing the calculation of Expression (5) are obtained. Accordingly, the CPU 61 obtains the intake-manifold-inlet gas temperature Tbin by block B5 in accordance with Expression (5). Meanwhile, at this stage, the above-described intake-manifold wall temperature Twallim and intake-manifold heat conductivity $\eta$im, which are variables, are required for obtaining the intake-manifold-outlet gas temperature Tbout by use of Expression (4) (block B4). These variables are obtained as follows.

Obtainment of Intake-Manifold Wall Temperature Twallim

The intake-manifold wall temperature Twallim has a strong correlation with the cooling water temperature THW detected by the water temperature sensor 75. Therefore, by means of block B14, the CPU 61 calculates the intake-manifold wall temperature Twallim in accordance with the following Expression (13), while using a function f1Twallim, which provides a value that increases with the cooling water temperature THW. Notably, the function f1Twallim is experimentally obtained in advance and stored in the ROM 62.

$$Twallim = f1Twallim(THW) \qquad (13)$$

Obtainment of Intake-Manifold Heat Conductivity $\eta$im

As shown in blocks B15 and B16, the CPU 61 calculates the intake-manifold heat conductivity $\eta$im in accordance with the following Expression (14).

$$\left. \begin{array}{l} \eta im = f\eta im(Vim, THW) \\ Vim = fVim(Gall) \end{array} \right\} \qquad (14)$$

In Expression (14), Vim represents the gas flow velocity within the intake manifold (hereinafter referred to as "intake-manifold gas flow velocity Vim"). Since the shape of the intake manifold 31 is known, as shown in the above-described Expression (14), the intake-manifold gas flow velocity Vim can be obtained on the basis of the intake-manifold-inlet gas flow rate Gall. The intake-manifold-inlet gas flow rate Gall is obtained by block B13 in accordance with the above-described Expression (12).

Notably, the intake-manifold gas flow velocity Vim may be obtained directly from an output of a flow velocity sensor disposed in the intake manifold 31. Although the intake-manifold gas flow velocity Vim is used as a variable of the function f$\eta$im of Expression (14), the intake-manifold-inlet gas flow rate Gall may be used as a variable, in place of the intake-manifold gas flow velocity Vim.

The above-described Expression (14) is based on the finding that "the intake-manifold heat conductivity $\eta$im is greatly influenced by the gas flow velocity Vim within the intake manifold 31." Although, in Expression (14), the cooling water temperature THW is also used as a variable in order to obtain the intake-manifold heat conductivity $\eta$im, the intake-manifold heat conductivity $\eta$im may be obtained, without use of the cooling water temperature THW, by use of a function of the intake-manifold gas flow velocity Vim ($\eta$im=f$\eta$im(Vim)) or a function of the intake-manifold-inlet gas flow rate Gall ($\eta$im=f$\eta$im(Gall)).

Figure 8:
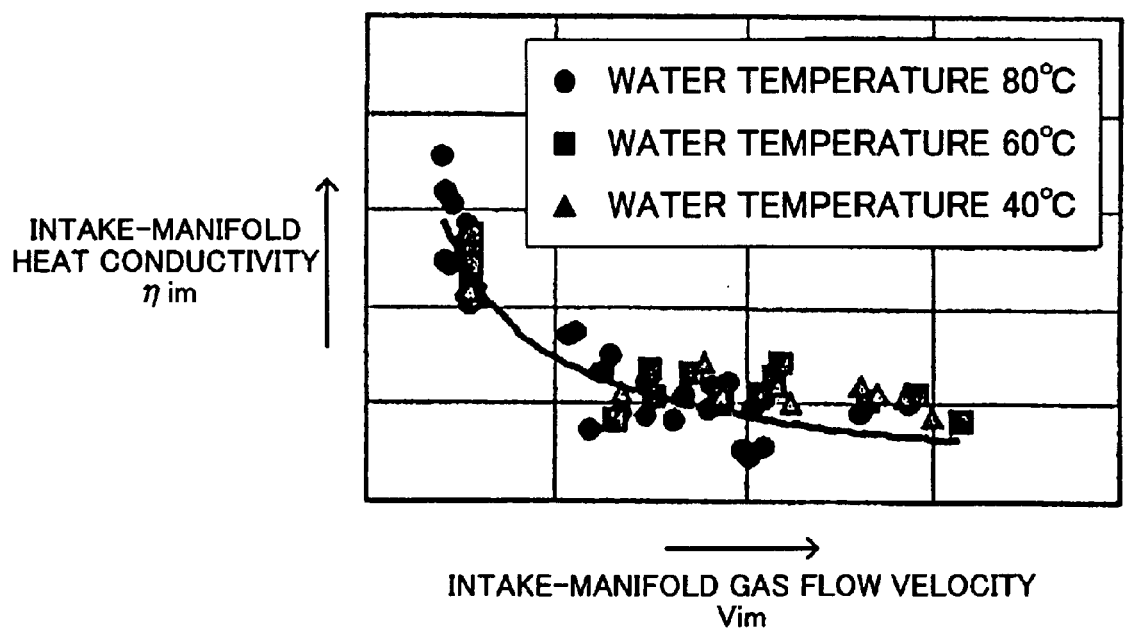
FIG. 8 is a graph showing actually measured values used to determine a function fηim for obtaining intake-manifold heat conductivity ηim.

Since the function f$\eta$im varies among engine models, the function f$\eta$im is determined for each model through comparison with actual measurement values. FIG. 8 shows actual measurement values for a certain engine. In the example of FIG. 8, the function f$\eta$im is determined as shown in the following Expression (15).

$$\eta im = f\eta im(Vim, THW) \qquad (15)$$
$$= (-0.000061 \cdot THW^2 + 0.003378 \cdot THW - 0.180831) \cdot$$
$$\ln(Vim) + (0.000048 \cdot THW^2 -$$
$$0.000227 \cdot THW + 0.509251)$$

Through the above-described procedure, the various values (Tbin, $\eta$im, Twallim) required for performing the calculation of Expression (4) are obtained. Thus, the CPU 61 obtains the intake-manifold-outlet gas temperature Tbout by means of block B4 on the basis of Expression (4). Accordingly, the CPU 61 obtains the all-gas flow rate Gcyl, which represents the quantity of all gases taken in the engine 10, by means of block B3 on the basis of Expression (3). Subsequently, the CPU 61 obtains the actual EGR ratio Ract by means of block B1 on the basis of Expression (1).

Next, there will be described various controls of the engines 10, which are performed by use of the various values obtained in the above-described manner.

Fuel Injection Quantity Control and Fuel-injection Timing Control

Figure 9:
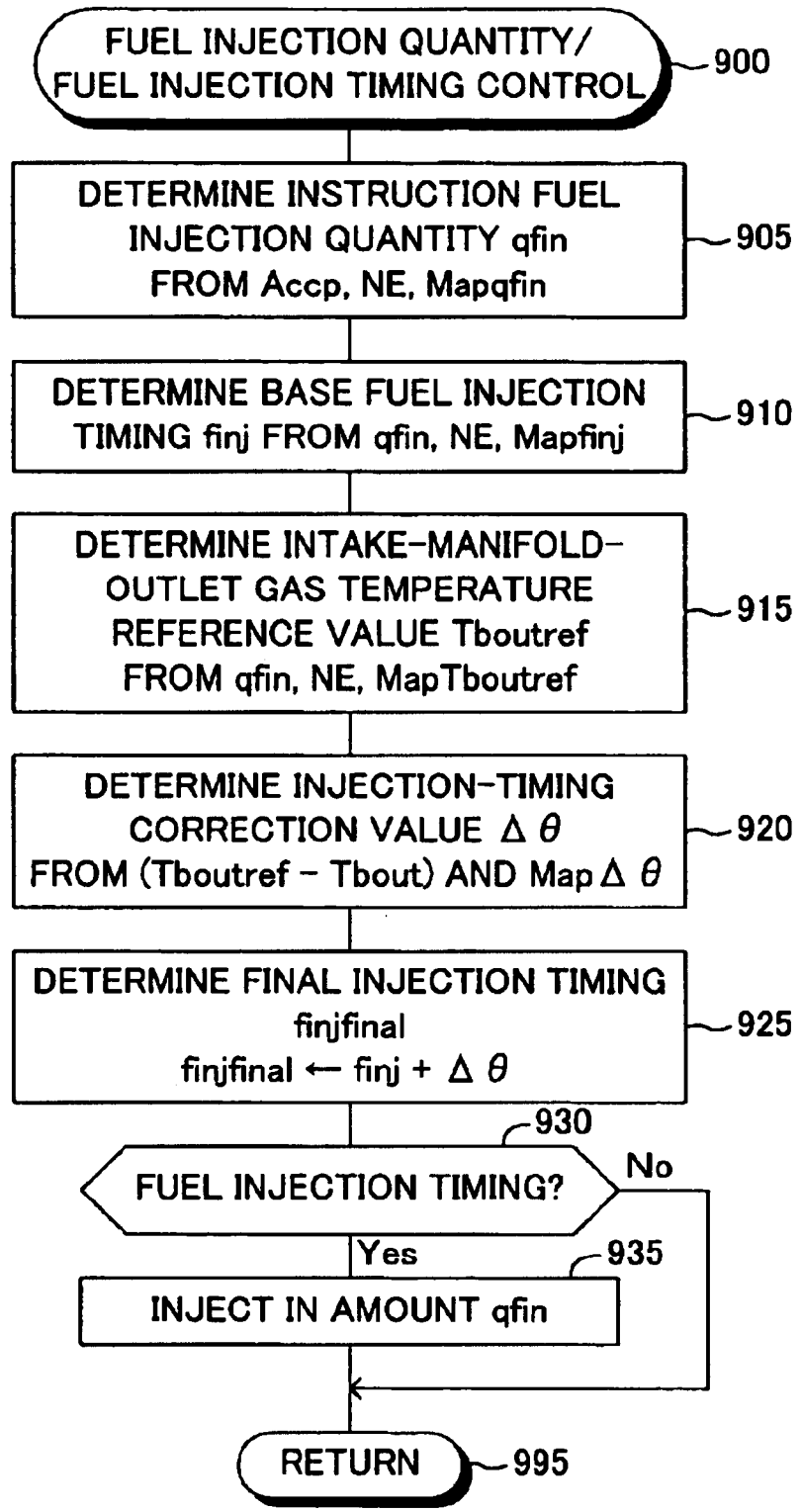
FIG. 9 is a flowchart showing a program that the CPU shown in FIG. 1 executes.
Figure 10:
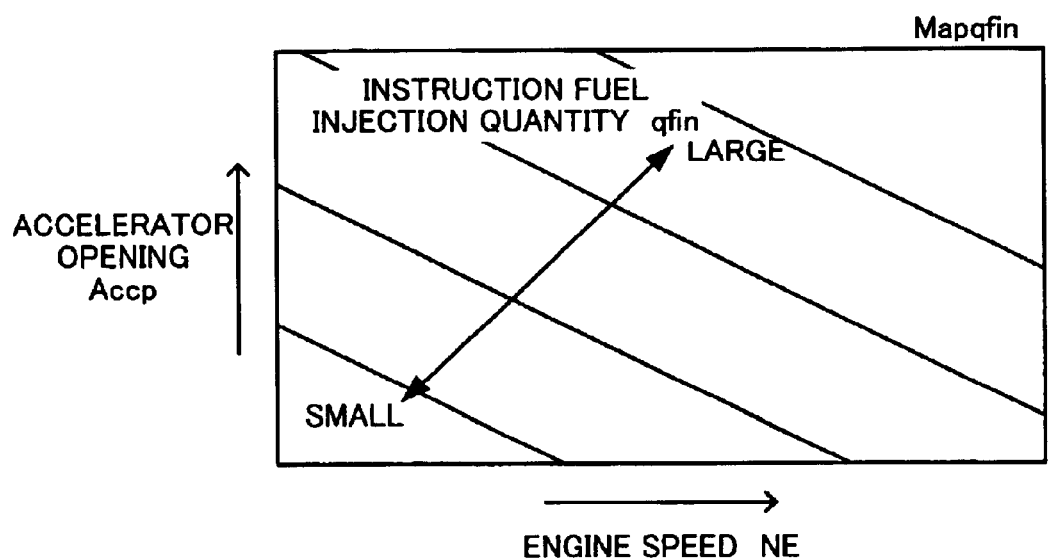
FIG. 10 is a table for determining an instruction fuel injection quantity, to which the CPU shown in FIG. 1 refers during execution of the program shown in FIG. 9.

The CPU 61 repeatedly executes, at predetermined intervals, a routine shown by the flowchart of FIG. 9 and adapted to control fuel injection quantity and fuel injection timing. Therefore, when a predetermined timing has been reached, the CPU 61 starts the processing from step 900, and then proceeds to step 905 so as to obtain an instruction fuel injection quantity qfin from the accelerator opening Accp, the engine speed NE, and a table (map) Mapqfin shown in FIG. 10. The table Mapqfin defines the relation between the accelerator opening Accp and the engine speed NE, and the instruction fuel injection quantity qfin; and is stored in the ROM 62.

Figure 11:
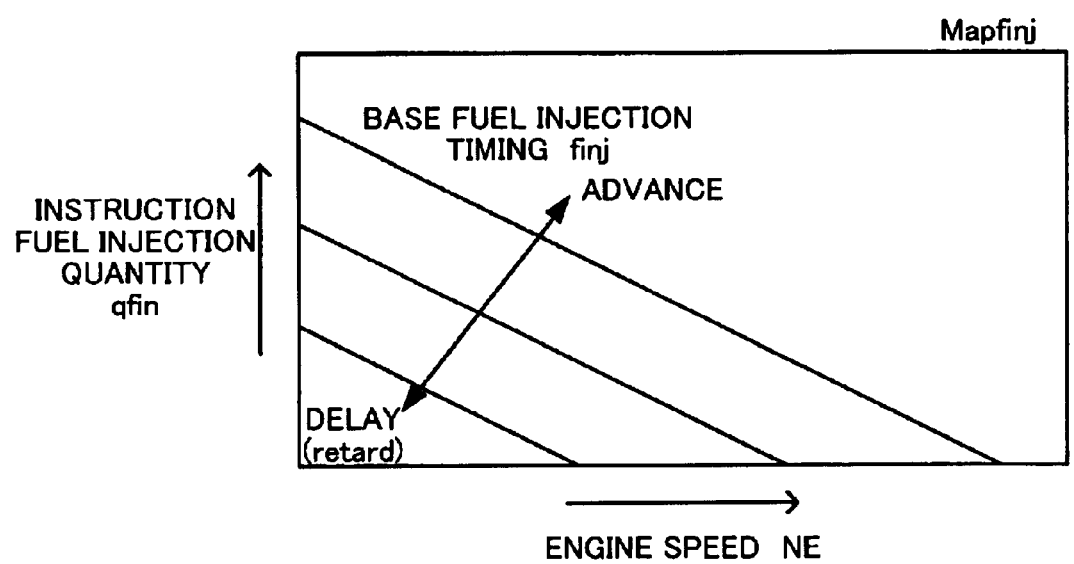
FIG. 11 is a table for determining a base injection timing, to which the CPU shown in FIG. 1 refers during execution of the program shown in FIG. 9.

Subsequently, the CPU 61 proceeds to step 910 so as to determine a base fuel injection timing finj from the instruction fuel injection quantity qfin, the engine speed NE, and a table Mapfinj shown in FIG. 11. The table Mapfinj defines the relation between the instruction fuel injection quantity qfin and the engine speed NE, and the base fuel injection timing finj; and is stored in the ROM 62.

Figure 12:
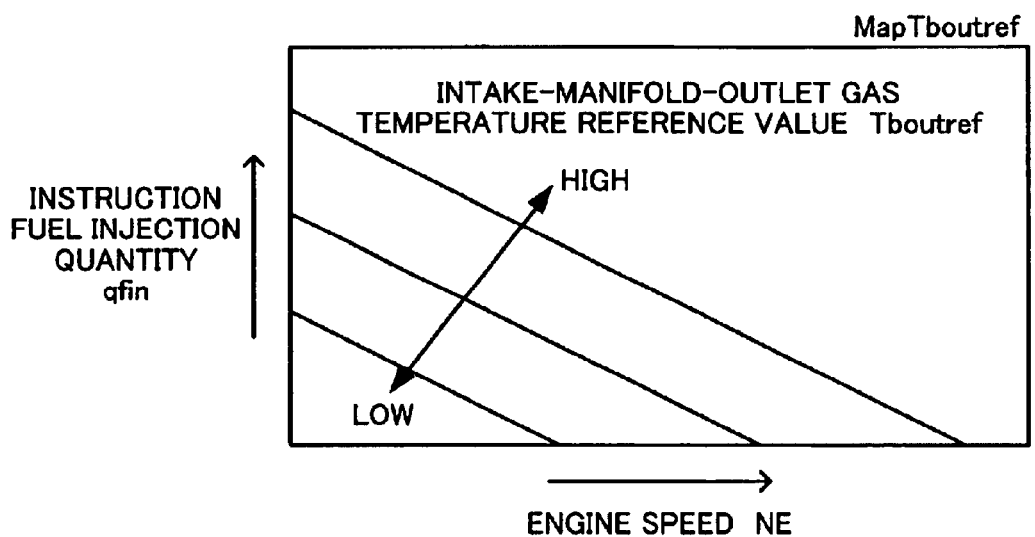
FIG. 12 is a table for determining an intake-manifold-outlet gas temperature reference value, to which the CPU shown in FIG. 1 refers during execution of the program shown in FIG. 9.

Subsequently, the CPU 61 proceeds to step 915 so as to determine the intake-manifold-outlet gas temperature reference value Tboutref from the instruction fuel injection quantity qfin, the engine speed NE, and a table MapTboutref shown in FIG. 12. The table MapTboutref defines the relation between the instruction fuel injection quantity qfin and the engine speed NE, and the intake-manifold-outlet gas temperature reference value Tboutref; and is stored in the ROM 62. This intake-manifold-outlet gas temperature reference value Tboutref represents a gas temperature Tbout at the outlet of the intake manifold 31 at the time of employment of the base fuel injection timing finj that is determined by use of the table shown in FIG. 11 for the combination of the instruction fuel injection quantity qfin and the engine speed NE.

Figure 13:
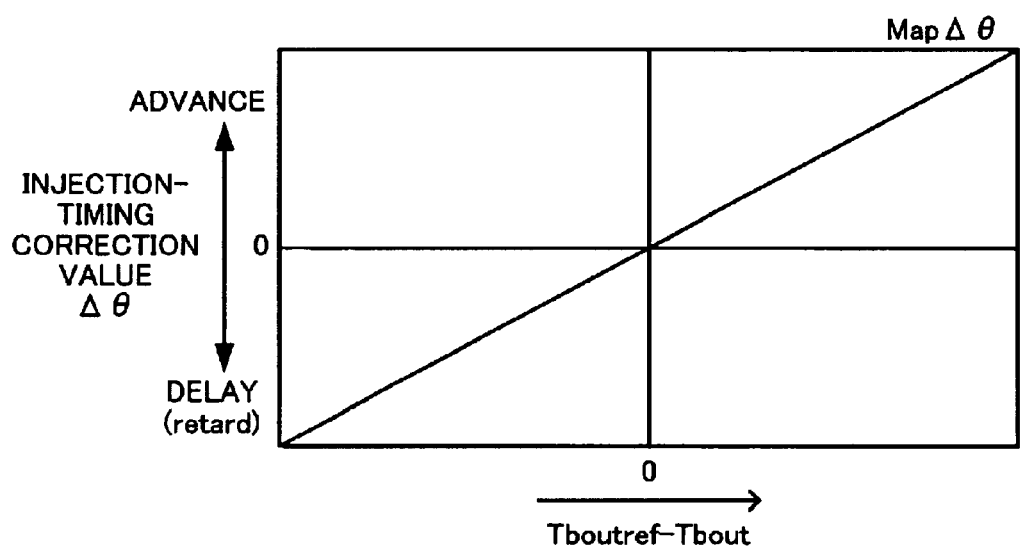
FIG. 13 is a table for determining an injection-timing correction value to which the CPU shown in FIG. 1 refers during execution of the program shown in FIG. 9.

Next, the CPU 61 proceeds to step 920 so as to determine an injection-timing correction value $\Delta\theta$ on the basis of the intake-manifold-outlet gas temperature reference value Tboutref determined in step 915, the difference (Tboutref−Tbout) between the intake-manifold-outlet gas temperature reference value Tboutref and an actual intake-manifold-outlet gas temperature Tbout obtained by block B4 shown in FIG. 2, and a table Map$\Delta\theta$ shown in FIG. 13. The table Map$\Delta\theta$ defines the relation between the difference (Tboutref−Tbout) and the injection-timing correction value $\Delta\theta$, and is stored in the ROM 62.

Subsequently, the CPU 61 proceeds to step 925 so as to correct the base fuel injection timing finj by the injection-timing correction value $\Delta\theta$ to thereby obtain a final injection timing finjfinal. As described above, the above-described steps 915 to 925 correct the injection timing in accordance with the intake-manifold-outlet gas temperature Tbout. In this case, as is apparent from FIG. 13, when the intake-manifold-outlet gas temperature Tbout becomes higher than the intake-manifold-outlet gas temperature reference value Tboutref, the injection-timing correction value $\Delta\theta$ assumes a negative value corresponding to the difference therebetween, so that the final injection timing finjfinal is shifted toward the delay side. In contrast, when the intake-manifold-outlet gas temperature Tbout becomes lower than the intake-manifold-outlet gas temperature reference value Tboutref, the injection-timing correction value $\Delta\theta$ assumes a positive value corresponding to the difference therebetween, so that the final injection timing finjfinal is shifted toward the advance side.

The reason why the injection timing is determined in the above-described manner is as follows. When the intake-manifold-outlet gas temperature Tbout is high, the ignitability of fuel is better than in the case where the temperature Tbout is low. Therefore, even when the fuel injection timing is delayed, the ignitability does not deteriorate, and $NO_x$ emission can be reduced. In contrast, when the intake-manifold-outlet gas temperature Tbout is low, the ignitability of fuel becomes worse. Therefore, the fuel injection timing is advanced in order to maintain the ignitability. This operation improves the output performance of the engine 10, and reduces $NO_x$ emission.

In subsequent step 930, the CPU 61 determines whether or not the present time coincides with the final injection timing finjfinal determined in step 925. When the present time coincides with the final injection timing finjfinal, the CPU 61 proceeds to step 935 in order to cause the fuel injection valve 21 for a cylinder whose injection timing has been reached to inject fuel in an amount corresponding to the instruction fuel injection quantity qfin determined in step 905. Subsequently, the CPU 61 proceeds to step 995 so as to end the present routine. When the result of the determination in step 930 is "No," the CPU 61 proceeds directly to step 995 so as to end the present routine. Through the above-described processing, fuel injection quantity control and fuel injection timing control are achieved.

EGR Control

Next, EGR ratio control will be described. The CPU 61 repeatedly executes, at predetermined intervals, a routine shown by the flowchart of FIG. 14 and adapted to control the EGR ratio. Therefore, when a predetermined timing has been reached, the CPU 61 starts the processing from step 1400, and then proceeds to step 1405 so as to determine a target intake oxygen concentration O2tgt from the instruction fuel injection quantity qfin at the present time, the engine speed NE at the present time, and a table MapO2tgt shown in the block of the present step. The table MapO2tgt defines the relation between the instruction fuel injection quantity qfin and the engine speed NE, and the target intake oxygen concentration O2tgt; and is stored in the ROM 62.

Subsequently, in step 1410, the CPU 61 obtains a supply fuel quantity Q per unit time from the instruction fuel injection quantity qfin and the engine speed NE; and in subsequent step 1415, the CPU 61 obtains an air surplus ratio $\lambda$ by the expression ($\lambda$=k$\lambda$ Gaact/Q) shown in the block of the present step. k$\lambda$ is a constant. In subsequent step 1420, the CPU 61 obtains a target EGR ratio Rtgt on the basis of the target intake oxygen concentration O2tgt determined in the above-described step 1405, the air surplus ratio $\lambda$ obtained in the above-described step 1420, and the expression (Rtgt=$\lambda$ (p O2tgt+q), where p and q are constants) shown in the block of step 1420. Notably, the relation among intake oxygen concentration, EGR ratio, and air surplus ratio is disclosed in detail in, for example, Japanese Patent Application Laid-Open (kokai) No. 10-141147.

Next, in step 1425, the CPU 61 determines whether or not the actual EGR ratio Ract obtained in block B1 shown in FIG. 2 is greater than the target EGR ratio Rtgt obtained in the above-described step 1420. When the result of the determination in step 1425 is "Yes," the CPU 61 proceeds to step 1430 in order to close the EGR control valve 52 by a predetermined amount, to thereby reduce the EGR ratio. Subsequently, the CPU 61 proceeds to step 1495 so as to end the present routine. In contrast, when the result of the determination in step 1425 is "No," the CPU 61 proceeds to step 1435 in order to open the EGR control valve 52 by a predetermined amount, to thereby increase the EGR ratio. Subsequently, the CPU 61 proceeds to step 1495. By virtue of the above operation, the EGR ratio is controlled in such a manner that the actual intake oxygen concentration becomes equal to the target intake oxygen concentration O2tgt, whereby emission of $NO_x$ and smoke can be reduced.

Figure 14:
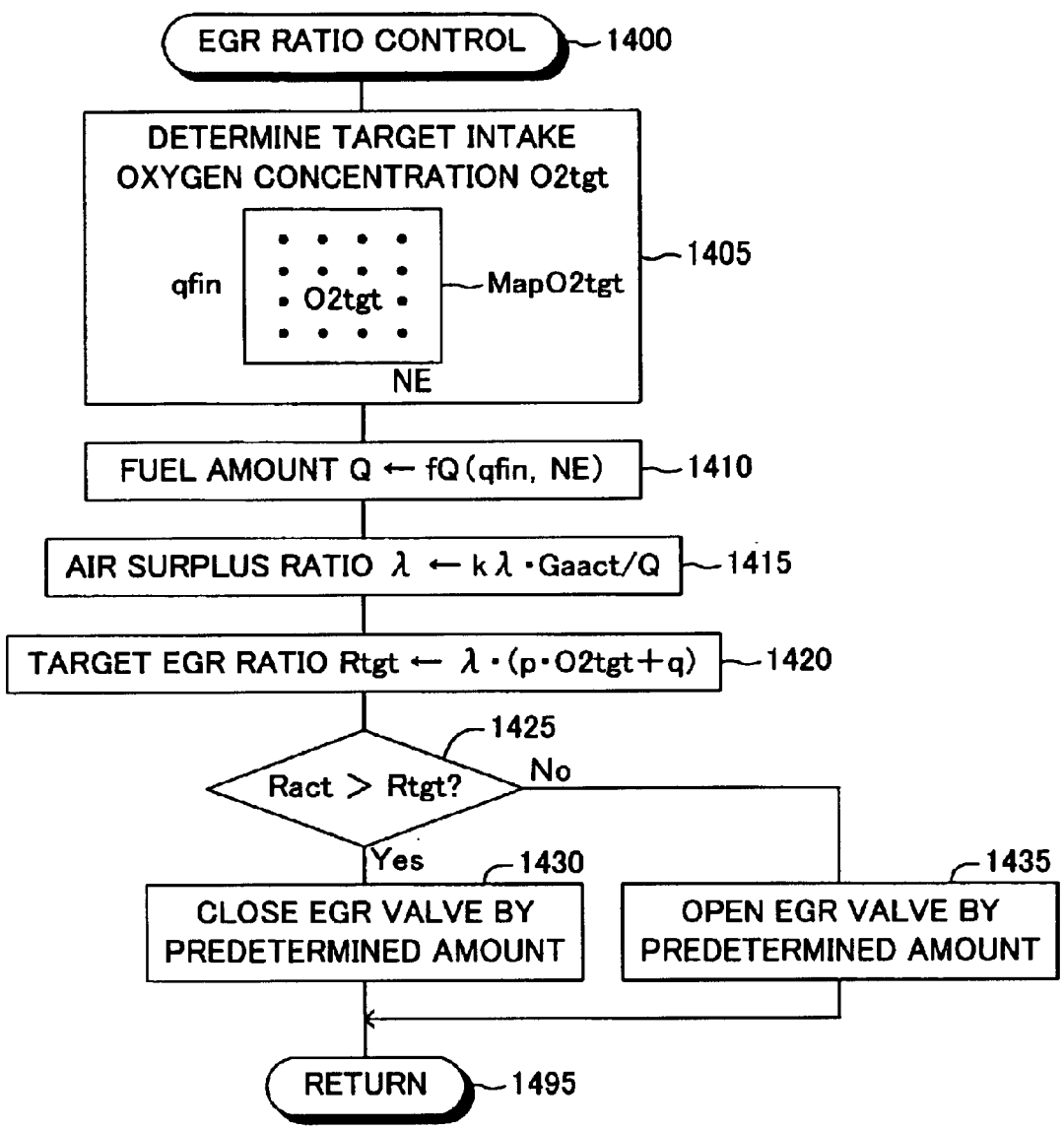
FIG. 14 is a flowchart showing a program that the CPU shown in FIG. 1 executes.
Figure 15:
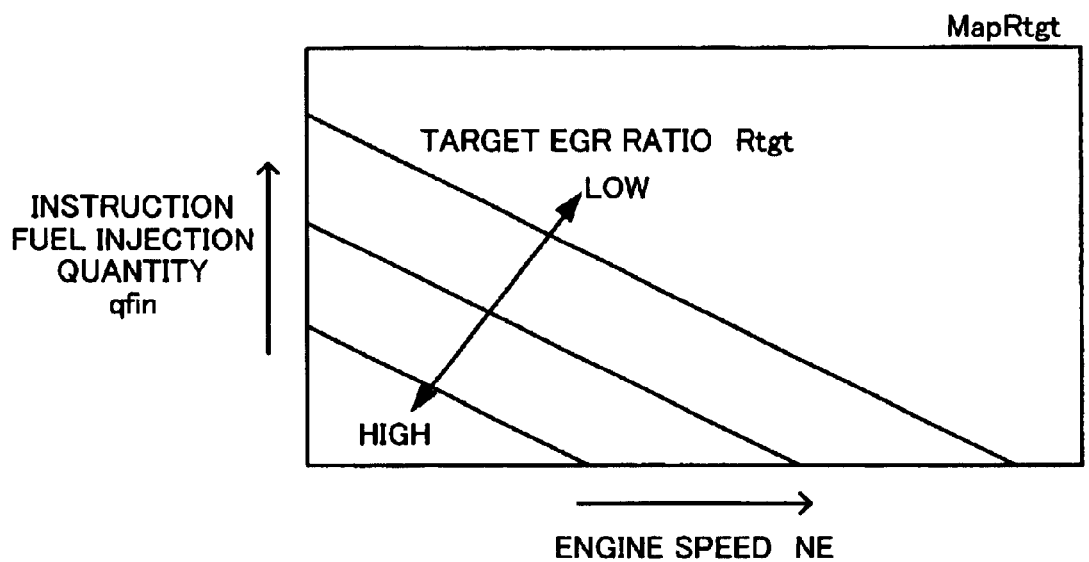
FIG. 15 is a table to which the CPU of an engine control apparatus according to a modification of the first embodiment refers so as to determine a target EGR ratio.

In the EGR ratio control by the routine shown in FIG. 14, the CPU 61 controls the EGR ratio by obtaining the target intake oxygen concentration O2tgt, and converting the target intake oxygen concentration O2tgt to the target EGR ratio Rtgt. However, the EGR ratio may be controlled as follows. The target EGR ratio Rtgt is obtained directly from an actual instruction fuel injection quantity qfin, an actual engine speed NE, and a table MapRtgt shown in FIG. 15 and defining the relation between the instruction fuel injection quantity qfin and the engine speed NE, and the target EGR ratio Rtgt; and the opening of the EGR control valve 52 is controlled in such a manner that the actual EGR ratio Ract becomes equal to the target EGR ratio Rtgt.

Boost Pressure Control

Figure 16:
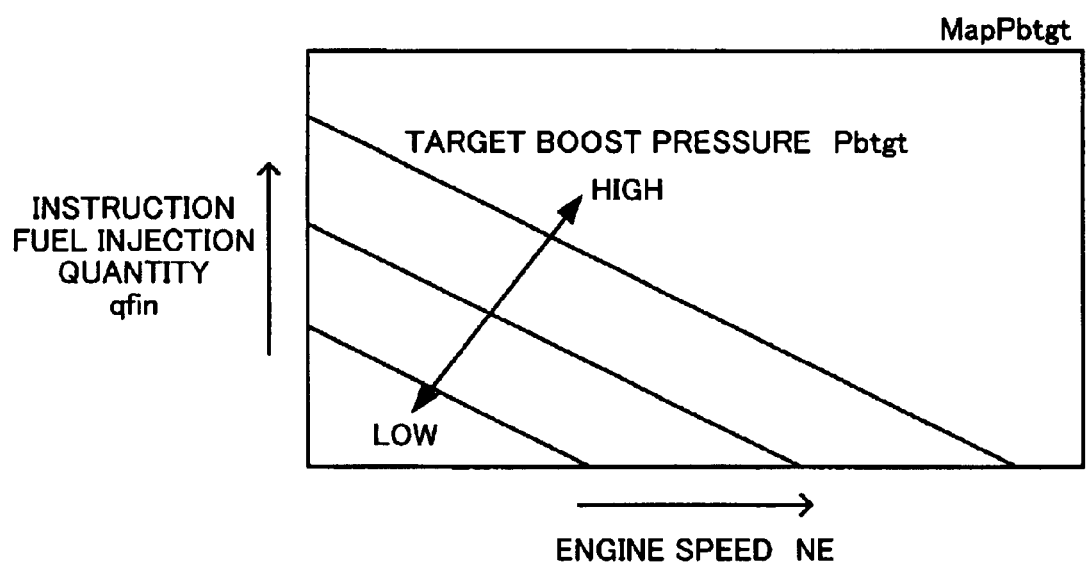
FIG. 16 is a table to which the CPU shown in FIG. 1 refers so as to determine a target boost pressure.

Next, boost pressure control will be described. The CPU 61 repeatedly executes, at predetermined intervals, an unillustrated routine for controlling boost pressure so as to determine, at predetermined intervals, a target boost pressure Pbtgt, from the instruction fuel injection quantity qfin at the present time, the engine speed NE at the present time, and a table MapPbtgt shown in FIG. 16. The table MapPbtgt defines the relation between the instruction fuel injection quantity qfin and the engine speed NE, and the target boost pressure Pbtgt; and is stored in the ROM 62.

Subsequently, the CPU 61 compares the determined target boost pressure Pbtgt and the actual boost pressure Pb obtained from the intake pressure sensor 73, and controls the opening of the turbocharger throttle vale 35c in such a manner that the actual boost pressure Pb becomes equal to the target boost pressure Pbtgt. The boost pressure control is executed in this manner.

As described above, in the embodiment of the engine control apparatus according to the present invention, since the cooling efficiency of the EGR-gas cooling apparatus 53 is obtained on the basis of the exhaust-circulation-pipe-inlet EGR-gas temperature and the EGR-gas-flow-rate corresponding value, the estimation accuracy of the exust-circulation-pipe-outlet EGR-gas temperature is improved. Further, since the intake-manifold-outlet gas temperature Tbout is estimated in consideration of heat exchange between the intake manifold 31 and a mixture gas (intake air) of new air and EGR gas, the estimation accuracy of the intake-manifold-outlet gas temperature Tbout is also improved. As a result, the EGR ratio can be estimated accurately.

The present invention is not limited to the above-described embodiment, and may be modified in various manners within the scope of the present invention. For example, the exhaust-manifold gas pressure Pex may be obtained on the basis of an output value of an exhaust pressure sensor disposed in the vicinity of a location at which the exhaust manifold 41 is connected to the exhaust circulation pipe 51.

What is claimed is:

1. An EGR-gas temperature estimation apparatus for an internal combustion engine which has an exhaust circulation pipe connected between an exhaust passage and an intake passage, an EGR control valve interposed in the exhaust circulation pipe and adapted to control flow rate of EGR gas flowing through the exhaust circulation pipe, and an EGR-gas cooling apparatus interposed in the exhaust circulation pipe, the EGR-gas temperature estimation apparatus comprising:

means for obtaining a temperature of the EGR gas on an inlet side of the EGR-gas cooling apparatus;

means for obtaining a corresponding value corresponding to the flow rate of the EGR gas flowing through the exhaust circulation pipe;

cooling efficiency obtaining means for obtaining a cooling efficiency of the EGR-gas cooling apparatus on the basis of the EGR-gas temperature on the inlet side of the EGR-gas cooling apparatus and the obtained corresponding value; and outlet EGR-gas temperature estimating means for estimating a temperature of the EGR gas on an outlet side of the EGR-gas cooling apparatus, on the basis of the EGR-gas temperature on the inlet side of the EGR-gas cooling apparatus and the obtained cooling efficiency.

2. An EGR-gas temperature estimation apparatus for an internal combustion engine according to claim 1, further comprising coolant temperature obtaining means for obtaining a temperature of a coolant of the EGR-gas cooling apparatus, wherein the outlet EGR-gas temperature estimating means estimates the temperature of the EGR gas on an outlet side of the EGR-gas cooling apparatus.

3. An EGR-gas temperature estimation apparatus for an internal combustion engine according to claim 2, wherein the outlet EGR-gas temperature estimating means estimates an EGR-gas temperature change by multiplying, by the cooling efficiency, the difference between the obtained temperature of the EGR gas on an inlet side of the EGR-gas cooling apparatus and the obtained coolant temperature, and estimates the temperature of the EGR gas on an outlet side of the EGR-gas cooling apparatus by subtracting the estimated EGR-gas temperature change from the temperature of the EGR gas on an inlet side of the EGR-gas cooling apparatus.

4. An EGR-gas temperature estimation apparatus for an internal combustion engine according to claim 3, wherein the cooling efficiency obtaining means obtains the cooling efficiency on the basis of a value obtained by dividing the obtained corresponding value by the obtained temperature of the EGR gas on an inlet side of the EGR-gas cooling apparatus.

5. An EGR-gas temperature estimation apparatus for an internal combustion engine according to claim 2, wherein the cooling efficiency obtaining means obtains the cooling efficiency on the basis of a value obtained by dividing the obtained corresponding value by the obtained temperature of the EGR gas on an inlet side of the EGR-gas cooling apparatus.

6. An EGR-gas temperature estimation apparatus for an internal combustion engine according to claim 1, wherein the cooling efficiency obtaining means obtains the cooling efficiency on the basis of a value obtained by dividing the obtained corresponding value by the obtained temperature of the EGR gas on an inlet side of the EGR-gas cooling apparatus.

7. An EGR-gas temperature estimation apparatus for an internal combustion engine which has an exhaust circulation pipe connected between an exhaust passage and an intake passage, an EGR control valve interposed in the exhaust circulation pipe and adapted to control flow rate of EGR gas flowing through the exhaust circulation pipe, and an EGR-gas cooling apparatus interposed in the exhaust circulation pipe to be located between the EGR control valve and a connection portion of the exhaust circulation pipe through which the exhaust circulation pipe is connected to the exhaust passage, the EGR-gas temperature estimation apparatus comprising:

inlet EGR-gas temperature obtaining means for obtaining, as an exhaust-circulation-pipe-inlet EGR-gas temperature, a temperature of the EGR gas at an EGR gas inlet, which is the connection portion of the exhaust circulation pipe through which the exhaust circulation pipe is connected to the exhaust passage;

EGR-gas-flow-rate corresponding value obtaining means for obtaining an EGR-gas-flow-rate corresponding value corresponding to the flow rate of the EGR gas flowing through the exhaust circulation pipe;

cooling efficiency obtaining means for obtaining a cooling efficiency of the EGR-gas cooling apparatus on the basis of the obtained exhaust-circulation-pipe-inlet EGR-gas temperature and the obtained EGR-gas-flow-rate corresponding value; and outlet EGR-gas temperature estimating means for estimating, as an exhaust-circulation-pipe-outlet EGR-gas temperature, a temperature of the EGR gas at an EGR gas outlet, which is a connection portion of the exhaust circulation pipe through which the exhaust circulation pipe is connected to the intake passage, on the basis of the obtained exhaust-circulation-pipe-inlet EGR-gas temperature and the obtained cooling efficiency.

8. An EGR-gas temperature estimation apparatus for an internal combustion engine according to claim 7, further comprising coolant temperature obtaining means for obtaining a temperature of a coolant of the EGR-gas cooling apparatus, wherein the outlet EGR-gas temperature estimating means estimates the exhaust-circulation-pipe-outlet EGR-gas temperature on the basis of the obtained temperature of the coolant.

9. An EGR-gas temperature estimation apparatus for an internal combustion engine according to claim 8, wherein the outlet EGR-gas temperature estimating means estimates an EGR-gas temperature change by multiplying, by the cooling efficiency, the difference between the obtained exhaust-circulation-pipe-inlet EGR-gas temperature and the obtained coolant temperature, and estimates the exhaust-circulation-pipe-outlet EGR-gas temperature by subtracting the estimated EGR-gas temperature change from the exhaust-circulation-pipe-inlet EGR-gas temperature.

10. An EGR-gas temperature estimation apparatus for an internal combustion engine according to claim 9, wherein the cooling efficiency obtaining means obtains the cooling efficiency on the basis of a value obtained by dividing the obtained EGR-gas-flow-rate corresponding value by the obtained exhaust-circulation-pipe-inlet EGR-gas temperature.

11. An EGR-gas temperature estimation apparatus for an internal combustion engine according to claim 8, wherein the cooling efficiency obtaining means obtains the cooling efficiency on the basis of a value obtained by dividing the obtained EGR-gas-flow-rate corresponding value by the obtained exhaust-circulation-pipe-inlet EGR-gas temperature.

12. An EGR-gas temperature estimation apparatus for an internal combustion engine according to claim 7, wherein the cooling efficiency obtaining means obtains the cooling efficiency on the basis of a value obtained by dividing the obtained EGR-gas-flow-rate corresponding value by the obtained exhaust-circulation-pipe-inlet EGR-gas temperature.

* * * * *